US010848427B2

United States Patent
Radlein et al.

(10) Patent No.: US 10,848,427 B2
(45) Date of Patent: Nov. 24, 2020

(54) LOAD BALANCED ACCESS TO DISTRIBUTED ENDPOINTS USING GLOBAL NETWORK ADDRESSES AND CONNECTION-ORIENTED COMMUNICATION SESSION HANDOFF

(71) Applicant: Amazon Technologies, Inc., Seattle, WA (US)

(72) Inventors: Anton Stephen Radlein, Seattle, WA (US); Harvo Reyzell Jones, Gig Harbor, WA (US); Hardeep Singh Uppal, Seattle, WA (US); Dennis Marinus, Seattle, WA (US); Dhiraj Gupta, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 39 days.

(21) Appl. No.: 16/219,797

(22) Filed: Dec. 13, 2018

(65) Prior Publication Data

US 2020/0162959 A1      May 21, 2020

Related U.S. Application Data

(60) Provisional application No. 62/770,646, filed on Nov. 21, 2018.

(51) Int. Cl.
*H04L 12/803* (2013.01)
*H04L 12/747* (2013.01)
(Continued)

(52) U.S. Cl.
CPC ........ *H04L 47/125* (2013.01); *H04L 12/4633* (2013.01); *H04L 41/0806* (2013.01);
(Continued)

(58) Field of Classification Search
CPC ............ H04W 28/0273; H04W 28/08; H04W 36/0033; H04W 36/08; H04W 80/04;
(Continued)

(56) References Cited

U.S. PATENT DOCUMENTS 6,427,174 B1    7/2002  Sitaraman et al.
8,498,295 B1    7/2013  Saxena et al.
(Continued)

FOREIGN PATENT DOCUMENTS

WO    WO 2020/106763    5/2020

OTHER PUBLICATIONS

Ballani et al., "Towards a Global IP Anycast Service", Aug. 22-26, 2005, Philadelphia, PA, SIGCOMM'05, ACM (Year: 2005).*
(Continued)

*Primary Examiner* — Ricky Q Ngo
*Assistant Examiner* — Michael K Phillips
(74) *Attorney, Agent, or Firm* — Knobbe, Martens, Olson & Bear, LLP

(57) ABSTRACT

Systems and methods are described to enable the load-balanced use of globalized network addresses, addressable throughout a network to access a network-accessible service. A set of global access points are provided, which advertise availability of the globalized network addresses. The access points enable rapid use of connection-oriented communication sessions by conducting an initialization phase of the sessions locally on the access point. Session context information is then handed off to an endpoint for the service, which can provide the service through the already-established sessions. To avoid breaking sessions due to changes in network routing, each access point can apply a uniform selection criteria for endpoints, such that if client traffic is routed to a different access point, that access point
(Continued)

redirects the traffic to the same endpoint previously servicing the traffic via an established session.

16 Claims, 12 Drawing Sheets

(51) Int. Cl.

| | |
|---|---|
| *H04L 29/12* | (2006.01) |
| *H04L 12/801* | (2013.01) |
| *H04L 12/851* | (2013.01) |
| *H04L 12/721* | (2013.01) |
| *H04L 12/715* | (2013.01) |
| *H04L 12/741* | (2013.01) |
| *H04L 12/24* | (2006.01) |
| *H04L 12/46* | (2006.01) |
| *H04W 28/02* | (2009.01) |
| *H04W 28/08* | (2009.01) |
| *H04W 36/00* | (2009.01) |
| *H04W 36/08* | (2009.01) |
| *H04L 29/08* | (2006.01) |
| *H04L 12/26* | (2006.01) |

(52) U.S. Cl.
CPC .......... *H04L 43/0876* (2013.01); *H04L 45/04* (2013.01); *H04L 45/38* (2013.01); *H04L 45/74* (2013.01); *H04L 45/742* (2013.01); *H04L 47/193* (2013.01); *H04L 47/2483* (2013.01); *H04L 61/256* (2013.01); *H04L 61/2514* (2013.01); *H04L 61/2567* (2013.01); *H04L 67/101* (2013.01); *H04L 67/1008* (2013.01); *H04L 67/1029* (2013.01); *H04L 67/1038* (2013.01); *H04W 28/0273* (2013.01); *H04W 28/08* (2013.01); *H04W 36/0033* (2013.01); *H04W 36/08* (2013.01)

(58) Field of Classification Search
CPC ............. H04L 2212/00; H04L 67/1002; H04L 67/101; H04L 67/1021; H04L 47/125; H04L 67/1029; H04L 45/742; H04L 61/2567; H04L 47/193; H04L 47/2483; H04L 45/38; H04L 45/04; H04L 45/74; H04L 61/256; H04L 41/0806; H04L 12/4633
See application file for complete search history.

(56) References Cited

U.S. PATENT DOCUMENTS

| | | |
|---|---|---|
| 9,407,539 B1 | 8/2016 | Dickinson et al. |
| 9,935,857 B1 | 4/2018 | Liu et al. |
| 2003/0182410 A1 | 9/2003 | Balan et al. |
| 2006/0064478 A1 | 3/2006 | Sirkin |
| 2007/0243821 A1 | 10/2007 | Hundscheidt et al. |
| 2011/0099259 A1* | 4/2011 | Lyon ................... H04L 67/1008 709/223 |
| 2011/0134769 A1 | 6/2011 | Lee et al. |
| 2011/0153941 A1* | 6/2011 | Spatscheck ........... G06F 9/5083 711/119 |
| 2011/0162060 A1 | 6/2011 | Vijayakumar et al. |
| 2011/0235595 A1 | 9/2011 | Mehta et al. |
| 2012/0250682 A1* | 10/2012 | Vincent ............... G06F 9/45558 370/390 |
| 2014/0369348 A1 | 12/2014 | Zhang et al. |
| 2015/0222528 A1 | 8/2015 | Lotfi et al. |
| 2015/0341431 A1 | 11/2015 | Hartrick et al. |
| 2016/0262083 A1 | 9/2016 | Chan |
| 2017/0013508 A1 | 1/2017 | Pallas |
| 2018/0097734 A1 | 4/2018 | Boutros et al. |
| 2019/0109899 A1* | 4/2019 | Newton ............. H04L 67/1023 |
| 2019/0132281 A1* | 5/2019 | Sawyer ................ H04L 47/122 |
| 2019/0281011 A1 | 9/2019 | Pang et al. |
| 2019/0312775 A1 | 10/2019 | Patil et al. |

OTHER PUBLICATIONS

Anonymous, Sample Configuration for BGP with Two Different Service Providers (Multihoming), Aug. 17, 2005, URL:http://www.cisco.com/c/en/us/support/docs/ip/border-gateway-protocol-bgp/23675-27.html.
International Search Report and Written Opinion in PCT/US2019/062277 dated Feb. 6, 2020.
Newswire.com, Securly Launches Industry First Anycast DNS Powered Entirely by Amazon AWS, Mar. 31, 2017, 3 pages.
Securly.com, The First Anycast DNS, Powered Entirely by Amazon AWS, Apr. 24, 2017, blog.securly.com, 3 pages.
Srisuresh et al., Load Sharing Using IP Network Address Translation (LSNAT), The Internet Society, Aug. 1998, 18 pages.
Zen, A Case Study in Global Fault Isolation, May 21, 2014, AWS Architecture Blog, 8 pages.

* cited by examiner

LOAD BALANCED ACCESS TO DISTRIBUTED ENDPOINTS USING GLOBAL NETWORK ADDRESSES AND CONNECTION-ORIENTED COMMUNICATION SESSION HANDOFF

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as "data centers," may include a number of interconnected computing systems to provide computing resources to users of the data center. The data centers may be private data centers operated on behalf of an organization or public data centers operated on behalf, or for the benefit of, the general public.

Because the resources of any individual computing device are limited, a variety of techniques are known to attempt to balance resource usage among devices. For example, a "load balancer" device may be placed between client devices requesting use of computing resources and servers providing such resources. The load balancer may attempt to distribute the requests among the servers, thus allowing the servers to work in conjunction to provide such resources. A significant drawback of use of such a load balancer is that it may create a single point of failure, such that if the load balancer fails, requests to the servers fail, and resources are made unavailable.

Another type of load balancing known in the art is domain name system (DNS) load balancing. DNS generally refers to a network of devices that operate to translate human-recognizable domain names into network address on a network, such as the Internet. To load balance using DNS, a DNS server is populated with network addresses of multiple computing devices offering a given resource. When responding to requests to resolve a domain name associated with that resource, the DNS server alternates which addresses are provided, thus causing requests for the resources to be divided among the provided addresses. Because the DNS server does not act as a conduit for traffic to the resources, and because DNS generally provides highly redundant operation, DNS load balancing generally avoids having a single point of failure. However, a significant drawback of DNS load balancing is the delay required to alter a load balancing scheme. DNS requests generally flow through a series of DNS resolvers, each of which may cache prior DNS results for a period. Thus, changes made at a DNS server in an attempt to alter how load is balanced among servers can take significant time to propagate. Particularly in instances where a server has failed, these delays can cause significant errors in network communications. Moreover, maintaining up-to-date DNS records can be difficult, as they generally must be modified as new devices are added to or removed from a load balancing scheme.

Yet another type of load balancing known in the art is the use of "anycast" network addresses. In a network, such as the Internet, different autonomous systems ("AS") provide devices with different network addresses. Each AS notifies it's neighboring AS's of addresses available within its network, by "advertising" the addresses. Most typically, each address is associated with a single location (e.g., a single device or group of devices). In an anycast configuration, multiple devices, often in multiple AS's, advertise the same network address. Depending on the configuration of neighboring AS's, client requests to access the address can then be routed to any of the multiple device, distributing load among the devices. A significant drawback of the use of anycast to attempt to load balance is that routing to the anycasted address is generally controlled by neighboring networks. These networks are often under control of other entities. Thus, it is difficult or impossible to completely control how requests are distributed among devices with an anycasted network address. Moreover, when the configuration of neighboring networks changes, the distribution of requests may also change, leading to volatility in the load balancing scheme.

DETAILED DESCRIPTION

Figure 1:
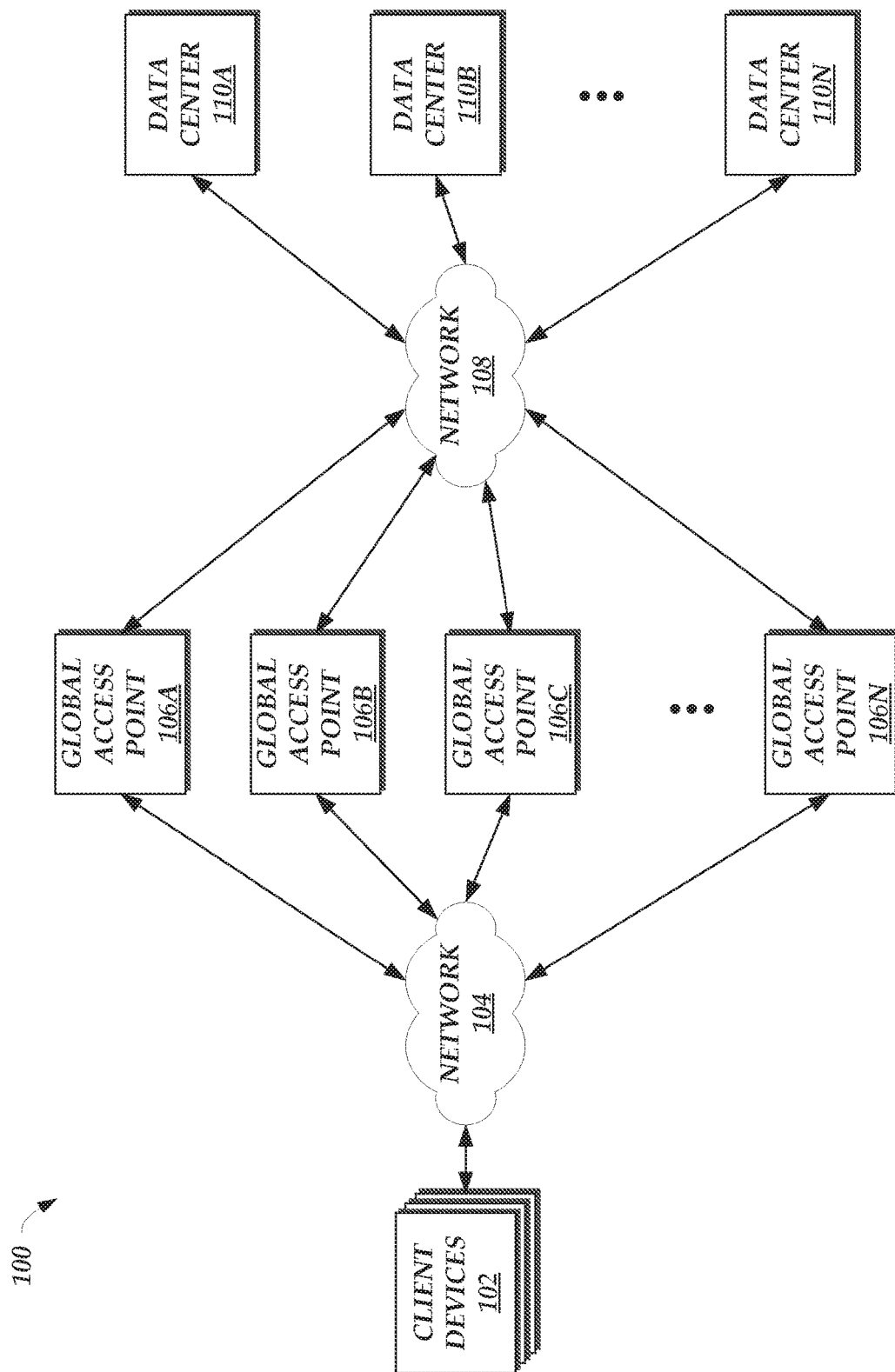
FIG. 1 is a block diagram depicting an illustrative logical network including multiple client devices and data centers, as well as a set of global access points providing load-balanced access to the data centers from a set of global network addresses.

Generally described, aspects of the present disclosure relate to providing load-balanced access to a pool of computing devices spread across multiple geographic locations, using one or more global network address. More specifically, aspects of the present disclosure relate to providing a distributed set of access points reachable via global network addresses, which access points select and route requests to endpoint devices within the pool based at least partly on load balancing the requests. In one embodiment, the access points utilize anycast routing techniques to advertise availability of global network addresses associated with the pool of computing devices, thereby attracting traffic addressed to those addresses. On receiving a request to access the pool, an access point may select an appropriate endpoint within the pool based on factors such as network performance criteria to the endpoint and load on the endpoint. The access point may then act as a proxy, routing the request to the endpoint and facilitating further communications between the endpoint and a requesting device. The access point may implement a variety of techniques, as disclosed herein, to provide resilient, efficient access to the pool of endpoint devices. As disclosed herein, the access points may be distributed among a wide geographic area, thus eliminating single points of failure within the system. Moreover, by utilizing anycast advertisements, the access points may distribute requests among the pool even when the requests are addressed to a single network address, avoiding complications and delays associated with other techniques, such as DNS-based load balancing. By acting as a proxy between clients and the pool of devices, rather than serving resources directly, the access points may control distribution of requests to the pool independently of how external devices choose to route the requests to the anycasted address, thus avoiding detriments associated with traditional anycast networking. Thus, embodiments disclosed herein significantly improve on prior load balancing techniques.

Embodiments of the present disclosure may illustratively be implemented in a wide geographic area. In one embodiment, the present disclosure is implemented on the worldwide Internet, and provides global internet protocol (IP) addresses, such as IP version 4 (IPv4) or IP version 6 (IPv6) addresses. Different data centers may exist in different geographic locations, and each data center may include one or more endpoint devices providing access to a network-based service. Examples of such services include, but are not limited to, web hosting, data storage, on-demand compute services, and the like. The resources at each data center may be limited, and thus an operator of the network-based service may wish to distribute load among such services. To simplify operation of the network-based service (e.g., avoiding the complications related to DNS-based load balancing), it may be desirable to provide the operator with a single set of relatively static network addresses for the service, which network addresses are manageable independently of the individual endpoints providing access to the service. Such network addresses are generally referred to herein as "global" network addresses. As used herein, the term "global" is intended to refer to the scope of the network address with relation to the service (e.g., that the network address applies to the entire service, rather than individual devices), and does not necessarily imply that such a network address is accessible worldwide. Nevertheless, embodiments of the present disclosure may be implemented to provide global network addresses that are generally accessible from a worldwide network, such as the Internet.

To provide global network addresses for a service, a system is disclosed that provides a set of geographically distributed global access points. Similarly to as noted above, the term "global" access point in this context is generally intended to refer to the access point providing access to the service generally, as opposed to individual endpoints, and does not necessarily imply that such access points exist worldwide (though such a configuration is possible). Generally, however, the access points are geographically distributed. In one embodiment, the global access points are located in geographic locations different and more numerous than those of the data centers providing endpoints for the service, decreasing the average network distance between the global access points and client devices attempting to access the service.

Each global access point may utilize anycast techniques to advertise the availability of the service via the one or more global network addresses associated with the service. Illustratively, each access point may utilize Border Gateway Protocol ("BGP") to advertise the global network addresses, by include a BGP "speaker" to announce availability of the global network address to neighboring networks. The global access point may thus attract traffic address to the global network addresses. As disclosed in more detail below, the global access points may in some instances "shape" BGP announcements to increase resiliency of a network-based service to network interruptions. For example, the global access points may divide their announced global network addresses into two groups, and assign a service at least one network address from each group. The global access points may then announce each group of addresses to a different neighboring network. In this manner, each access point can effectively create two paths to reach the point: through a first neighbor using an address of the first group, or through a second neighbor using an address of a second group. Thus, if one neighboring network fails in some way, an alternative path to reach the access point exists. Moreover, because each access point may operate in this manner, if one access point fails entirely, traffic may be automatically routed to another access point via traditional anycast routing mechanisms. While examples are provided herein related to two groups, any number of groups may be provided.

To provide even further resiliency, each access point may in some instances segregate traffic according to a specific subset of the advertised global network addresses, and utilize different devices or program threads to process traffic addressed to each subset. In this way, if traffic of one subset is problematic to operation of the access point (e.g., due to misconfiguration related to a global network address of the subset), operation of a device or thread handling traffic of another subset is unlikely to be effected. In one embodiment, the access point uses a combination of different network address groups, and segregated processing of subsets of each network group. Moreover, services may be "shuffled" among the subsets of each group, such that if two services are assigned network addresses within a common subset of one group, the two services are likely to be assigned network addresses within different subsets of a second group. Under this configuration, if a specific service's configuration causes issues to operation of an access point with respect to a subset of one group, other services would likely still be reachable via an alternative group (where their addresses are unlikely to be on the same subset as the problematic service). By increasing the number of address groups and subsets, the total number of services effected by a problematic service can be progressively decreased.

After receiving a request to access a service, a global access point can be configured to route the traffic to an appropriate endpoint within a data center providing the service. To do so, the access point may be required to be aware of a network address of the endpoint. In one embodiment, each data center is configured with a resource manager device that maintains a listing of endpoints providing access to a service. The resource manager may information the access points of the endpoints, including network address information for the endpoints. Thus, on receiving a request to access a service, each access point may be configured to select an available endpoint for the service and to route the request to that endpoint. As will be discussed below, the endpoint may be selected based on a combination of criteria, including but not limited to network performance criteria to the endpoint (e.g., in terms of latency) and desired load balancing across endpoint.

In one embodiment, to route traffic to an endpoint, each access point is configured to utilize network address translation ("NAT"). NAT techniques are known within the art, and thus will not be described in detail herein. However, in general, NAT techniques enable a device to act as a middleman between two devices, while rewriting aspects of each data packet, such as a source and destination network address, to facilitate communications between the devices. In accordance with embodiments of the present disclosure, each access point may operate to replace a source network address of a requesting device with its own network address (e.g., a unicast network address uniquely identifying the global access point), and to replace the destination network address (e.g., the global network address of a service) with a network address of an endpoint providing that service. The access point may then route the packet to the endpoint, receive a response from the endpoint (if any), perform a reverse translation of source and destination (e.g., replacing the source of the response with the global network address and the destination of the response with the network address of the requesting device), and return the packet to the requesting device. In one embodiment, the access point may utilize port translation (known in the art) to facilitate distinction of traffic flows (series of interrelated packets) when utilizing NAT, to ensure correct translation of addresses when handling traffic from multiple requesting devices.

Beneficially, the use of NAT enables the access point to forward traffic received from a client device to an endpoint, with minimal interference to a connection between the client device and endpoint. For example, by utilization of NAT, an access point is not required to act as a "termination" point for a certain network protocols, such as the Transmission Control Protocol (TCP). Alternative routing techniques may, for example, cause an access point to accept a TCP connection from a client device, and initialize a second TCP connection to an endpoint. Maintaining multiple such connections (and correspondences between them) may significantly increase the resource usage of an access point, reducing its capacity to route traffic addressed to global network addresses. Thus, use of NAT can provide benefits over such techniques.

Moreover, the use of NAT at an access point enables traffic to be directed to a global network address different from any address utilized by an endpoint, thus preventing disclosure of the address actually utilized by the endpoint. As such, the endpoint may be protected from receiving traffic directly. This is turn may reduce or eliminate the vulnerability of the endpoint to network attacks, such as denial of service (DoS) attacks. In this manner, the global access points can provide benefits similar to those provided by traditional content delivery networks (CDNs). However, unlike CDNs, the access points need not replicate the functionality of service (e.g., by implementing a web server at each point of presence within the CDN). Rather, the access points of the present disclosure can enable traffic to flow through the access point, enabling packets of a requesting device to reach an endpoint providing the service. For this reason among others, the global access points disclosed herein may provide a greater range of functionality than CDNs, enabling load balancing and distribution among any number of different network-based services.

In another embodiment, to route traffic to an endpoint, each access point is configured to utilize encapsulation. Encapsulation is a known networking technique, and thus will not be described in detail herein. However, in general encapsulation can be utilized to add additional information (frequently in the form of a header, and sometimes also in the form of a trailer) to a data packet, thus "wrapping" or encapsulating the data packet to result in an encapsulated data packet. In the context of the present disclosure, encapsulation may be utilized to provide a "network tunnel" between each access point and endpoint. Specifically, when a packet is received at an access point from a client device and addressed to a network address of a service provided by an endpoint, the access point may encapsulate the packet with additional information enabling the packet to be routed to a selected endpoint, such as a network address of the endpoint. The encapsulated packet may then be routed to the endpoint over a physical network. The endpoint may "decapsulate" the encapsulated packet to remove the additional information, and process the decapsulated packet as if it were received directly from the client device.

In one embodiment, the endpoint may respond directly to the client device, via a physical network connecting the endpoint to the client device. In another embodiment, the endpoint may respond to the client device by encapsulating a response packet, and transmitting the encapsulated response packet back to the access point. The access point may in turn decapsulate the response packet and return the response packet to the client. Direct return of responses from an endpoint to a client device may beneficially reduce workload of an access point, and may also reduce traffic on a physical network connecting the access point to the endpoint. However, direct return of responses may be required to utilize a physical network connecting the endpoint to the client device, which may not be as robust as the physical network connecting the access point to the endpoint. For example, where the endpoint and access point are connected via a private network, while the access point, endpoint, and client device are connected via a public network (such as the Internet), return of responses through the access point (rather than direct return) may be preferable, as it may be preferable to minimize the total distance traveled on the public network (e.g., where the access point is located closer to the client device than the endpoint).

In general, encapsulation of packets between access points and endpoints may increase the computational resource usage of access points and endpoints, as compared to use of NAT to route packets from access points to endpoints. However, encapsulation may also provide benefits over a NAT implementation. For example, encapsulation may provide for resiliency of TCP session in the event that packets of a client device are routed to different global access points during the TCP session. Such routing may occur, for example, based on operation of networks between the client device and the different access points, due to potential changes in how the networks process anycast advertisements of the different access points. Where an access point utilizes NAT to route packets to an endpoint, each access point may maintain NAT information independently. Thus, if client device packets are routed to a different access point, that second access point may not have sufficient information to gracefully take over communications of the client (e.g., the transformed packets of the second access point may not be identical to what would have been generated at the initial access point). This may result in the TCP session of the client device and the endpoint being broken, requiring that the client device reestablish the TCP connection.

In contrast, encapsulation can enable graceful handling of rerouting of client requests between access points. Under either NAT or encapsulation implementations, each access point may be configured to select an endpoint in a consistent manner (e.g., applying the same selection algorithm). Thus, client device packets would be expected to be routed to the same endpoint, regardless of the access point to which they were sent initially. Moreover, by utilizing encapsulation, no data of the initial client device's packets need be changed when routing the packets to the endpoint. Rather, that data can be encapsulated (e.g., with additional information enabling routing to the endpoint), and regained at the endpoint after decapsulation. For this reason, even if client packets are routed to different access points, the final data available to the endpoint after decapsulation can be the same, enabling the endpoint to maintain a TCP session with the client device even when data flows through different access points.

In some embodiments, to further improve performance in implementations that utilize encapsulation, each access point can be configured to assist endpoints in establishing connection-oriented communication sessions, such as TCP sessions, with client devices. Connection-oriented communication sessions generally require a session initialization phase, where the two parties to the session communicate to establish mutual understanding of communication state. TCP sessions, for example, utilize a "three-way handshake." The TCP three-way handshake is known in the art and thus will not be described in detail herein. However, in brief, a TCP session is established when a first party sends a synchronize ("SYN") packet to a second party (including a first party sequence number to be used during the session), the second party responds with a synchronize-acknowledge ("SYN-ACK") packet (acknowledging the first party sequence number and including a second party sequence number), and the first party responds to the SYN-ACK packet with an acknowledgement ("ACK") packet (acknowledging the second party sequence number). Because the three-way handshake requires three separate communications between the parties, increases in latency between the parties during the handshake are magnified three-fold. In the context of the present disclosure, for example, if communications between a client device and endpoint incur a 100 millisecond (ms) latency, the three-way handshake can be expected to take at least 300 milliseconds. Since such a handshake is required prior to transmission of data over a TCP session, it is beneficial to reduce the time required to initialize the TCP session.

Accordingly, in embodiments of the present disclosure, each global access point may be configured to conduct a TCP three-way handshake with a client device, and then to "hand off" the TCP connection to an endpoint. Specifically, each access point may be configured to "listen" for incoming SYN packets from client devices, and to respond to such packets by conducting the TCP three-way handshake. After the handshake is completed, the access point may transfer TCP session information (e.g., the first and second party sequence numbers of the TCP session) to an endpoint selected to provide a requested service to the client device. On receiving the TCP session information, the endpoint may "adopt" the TCP session, and process client device data packets as if the TCP session had been established between the client device and the endpoint. Because the access point can be assumed to be "closer" to the client device in terms of latency, the time required to establish the TCP session is reduced, without interfering with the ability of the client device and the endpoint to communicate via a common TCP session. While examples are provided herein with respect to TCP handshakes, statefully communication sessions each generally require an initialization phase. Embodiments described herein may be utilized to conduct such an initialization phase at an access point, while handing off context for the connection-oriented communication session to an endpoint to enable a client device and the endpoint to communicate via the connection-oriented communication session.

As will be appreciated by one of skill in the art in light of the present disclosure, the embodiments disclosed herein improves the ability of computing systems to provide network-accessible services. Specifically, embodiments of the present disclosure improve on prior load balancing techniques, by providing scalable, resilient, and responsive load-balancing across a common network address, improving on known load balancing techniques. Moreover, the presently disclosed embodiments address technical problems inherent within computing systems; specifically, the limited nature of computing resources with which to provide network-accessible services and the difficulties of load-balancing requests to such services in a scalable, resilient, and responsive manner. These technical problems are addressed by the various technical solutions described herein, including the use of a distributed set of access points associated with a common network address, each configured to receive requests for a service, and to route the requests to endpoints of the service based at least partly on load-balancing the requests among the endpoints. Thus, the present disclosure represents an improvement on existing network load-balancing systems and computing systems in general.

The foregoing aspects and many of the attendant advantages of this disclosure will become more readily appreciated as the same become better understood by reference to the following description, when taken in conjunction with the accompanying drawings.

FIG. 1 is a block diagram depicting an illustrative logical environment 100 including multiple client devices 102 in communication with a set of global access points 106A-N via a first network 104, which global access points 106A-N are in communication with a set of data centers 110A-N via a second network 108. While the client devices 102, global access points 106 and data centers 110 are within FIG. 1 in groups, the client devices 102, global access points 106 and data centers 110 may be geographically distant, and independently owned or operated. For example, the client devices 102 could represent a multitude of users in various global, continental, or regional locations accessing network-accessible services provided by the data centers 110, which data centers may further be distributed among various global, continental, or regional locations. The global access points 106 may similarly be distributed. In one embodiment, the data centers 110 represent devices in locations under control of a single entity, such as a "cloud computing" provider, while the global access points 106 represent devices in co-tenanted locations, such as network "points of presence" or Internet Exchange Points (IXPs). The global access points 106 may generally be more numerous than the data centers 110 and in distinct physical locations. However, in other embodiments, one or more of the access points 106 may be located within one or more data centers 110. Accordingly, the groupings of client devices 102, access points 106, and data centers 110 within FIG. 1 is intended to represent a logical, rather than physical, grouping.

The networks 104 and 108 may be any wired networks, wireless networks or combination thereof. In addition, the networks 104 and 108 may be a personal area network, local area network, wide area network, cable network, satellite network, cellular telephone network, or combination thereof. In the example environment of FIG. 1, network 104 is a global area network (GAN), such as the Internet, while the network 108 is a private network dedicated to traffic associated with an entity providing the data centers 110 and access points 106. Protocols and components for communicating via the other aforementioned types of communication networks are well known to those skilled in the art of computer communications and thus, need not be described in more detail herein.

While each of the client devices 102 and access points 106 are depicted as having a single connection to the network 104, individual components of the client devices 102 and access points 106 may be connected to the network 104 at disparate points (e.g., through different neighboring networks within the network 104). In some embodiments, the data centers 110 may additionally or alternative be connected to the network 104. Similarly, while each of the access points 106 and data centers 110 are depicted as having a single connection to the network 108, individual components of the access points 106 and data centers 110 may be connected to the network 108 at disparate points. Accordingly, communication times and capabilities may vary between the components of FIG. 1. The network configuration of FIG. 1 is intended to be illustrative of a communication path in embodiments of the present disclosure, and not necessarily to depict all possible communications paths.

Client devices 102 may include any number of different computing devices capable of communicating with the global access points 106. For example, individual client devices 102 may correspond to a laptop or tablet computer, personal computer, wearable computer, server, personal digital assistant (PDA), hybrid PDA/mobile phone, mobile phone, electronic book reader, set-top box, camera, digital media player, and the like. In some instances, client devices 102 are operated by end users. In other instance, client devices 102 themselves provide network-accessible services, which interact with the global access points 106 to access other network-accessible services.

The data centers 110 of FIG. 1 illustratively include endpoint computing devices providing one or more network-accessible services on behalf of one or more service providers. Illustratively, the data centers 110 may be operated by a "cloud computing" provider, which makes host computing devices within the data center available to service providers for providing their services. The cloud computing providing may generally manage operation of the data center, while providing various mechanisms for the server providers to configure their respective endpoints. One illustrative configuration of a data center 110 is provided below with respect to FIG. 2.

In accordance with embodiments of the present disclosure, the cloud computing provider may enable service providers to associate their endpoints with one or more global network addresses, which are addressable on the network 104 to interact with the data centers 110 in a load-balanced manner. The cloud computing provider may further enable the service providers to specify how such load-balancing should occur, such as by specifying a percentage of requests to be routed to each data center 110. The cloud computing provider may further enable the service providers to alter the configuration of endpoints independently of the global network addresses, such that altering the specific endpoints providing a service does not require reconfiguration of the network addresses. Use of global network addresses may significantly simplify operation of network services, since any client device 102 wishing to connect to the service may simply transmit a request to a global network address of the service. Alterations to the endpoints providing the service may then be made without the need to alter DNS records for the service, for example. As will be described below, in some instances these alterations may be made automatically, such that no user action is needed even as endpoints for the service change within the data centers 110.

To facilitate global network addresses, a set of global access points 106A-N are provided. Each access point may generally include one or more computing devices configured to obtain requests from client devices 102 to interact with services, and to route such requests to an endpoint within a data center 110 selected based at least partly on load-balancing requests across the data centers 110. Access points 106 may further act as a type of proxy for the endpoints, enabling traffic between client devices 102 and data centers 110 to flow across the access points 106. Operation of access points 106 is discussed in more detail below. However, in brief, the may utilize anycast techniques to broadcast availability of global network addresses to neighboring network devices within the network 104, which in one embodiment includes devices not under the control of a common entity as provides the access points 106A. The access points 106 may thus attract traffic addressed to the global network addresses. The access points 106 may thereafter select an endpoint to which to direct the traffic, based on factors such as availability of endpoints, load-balancing across data centers 110, and performance criteria between the access point 106 and the various data centers 110.

After selecting a data center 110, an access point 106 can route the request to the endpoint. In one embodiment, the access point 106 uses NAT translation or encapsulation to redirect the request to the endpoint over the network 108, preventing disclosure of a network address of the endpoint to the client devices 102. Where connection-oriented communication sessions are utilized between client devices 102 and an endpoint, the access point 106 may operate to conduct an initialization phase of the communication session on behalf of the endpoint, in accordance with the present embodiments. In instances where the network 108 is a private network, the global access points 106 may further function as an "offloading" point for traffic to the endpoints, moving that traffic from a public network (e.g., network 104) to the private network 108. Generally, such a private network would be expected to have greater performance than a public network, and thus such offloading may further increase the speed of communication between client devices 102 and endpoints.

As noted above, the access points 106 may implement a variety of techniques to ensure resiliency of a network service using a global network address. Illustratively, the use of anycast to advertise access points 106 may provide resiliency between access points 106, as the failure of an individual access point 106 can generally be expected to cause devices of the network 104 to route requests to another access point 106. Moreover, to address potential failures of the network 104, each access point 106 can be configured to control its announcement of global network addresses on the network 104, providing multiple routing paths for each service to the access point 106. Additional details regarding such control of announcements to provide routing paths is provided below. Still further, to address potential failures within an access point 106, each access point 106 may be configured to include multiple flow managers, handling different traffic flows addressed to global network addresses. The flow managers may be distributed logically, such as across program threads, and/or physically, such as across processors or computing devices. Thus, failure of one flow manager may have little or no impact on other flow managers within an access point 106, limiting impact of partial failures within an access point 106. One illustrative configuration of an access point 106 is discussed below with reference to FIG. 4.

Figure 2:
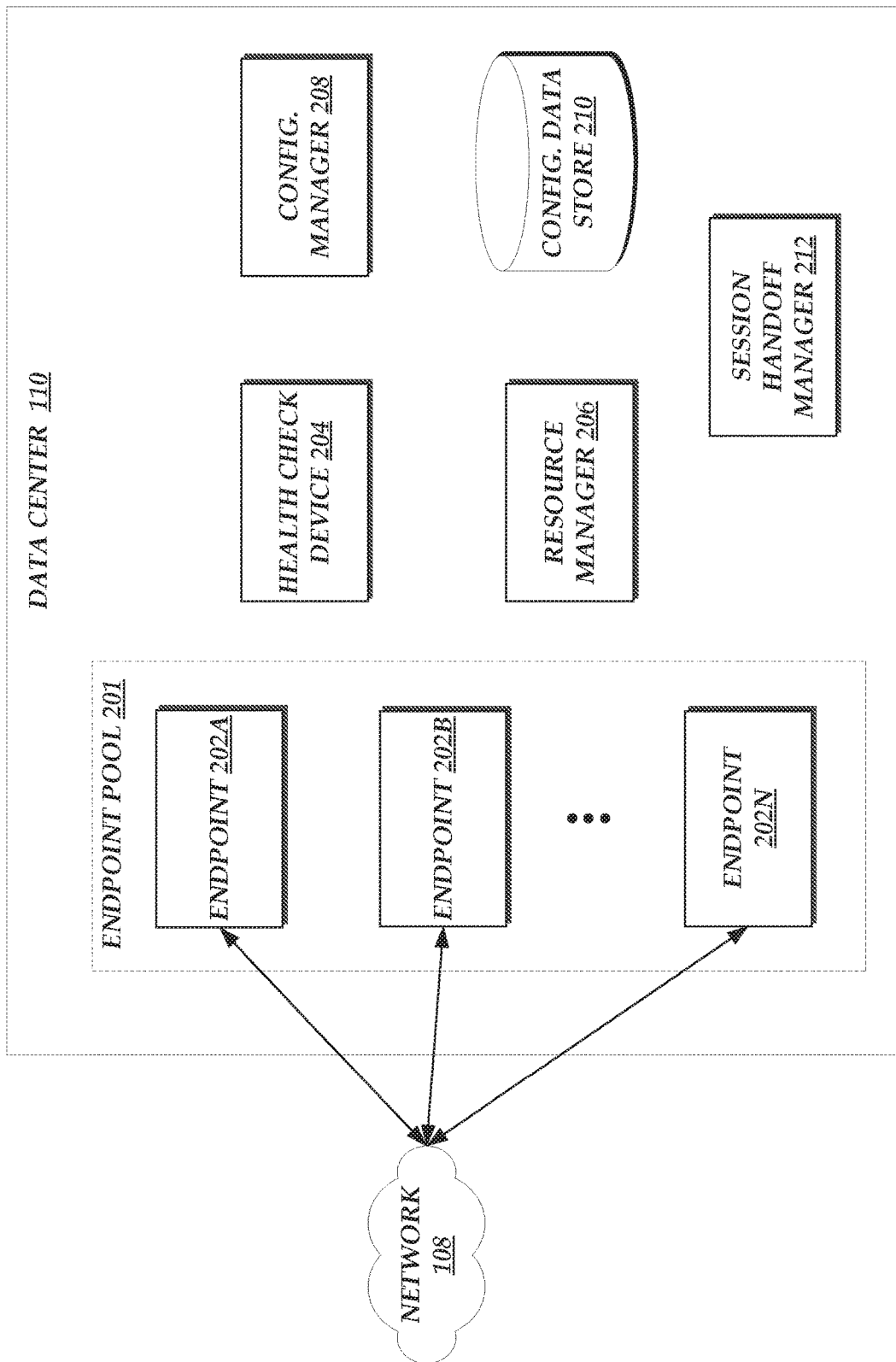
FIG. 2 is a block diagram depicting an illustrative configuration of a data center of FIG. 1.

FIG. 2 is a block diagram depicting an illustrative configuration of a data center 110 of FIG. 1. As shown in FIG. 2, the data center 110 includes an endpoint pool 201 containing a set of endpoints 202A-N. Each endpoint 202 illustratively represents a computing device configured to provide access to a network-accessible service. In one embodiment, endpoints 202 are individual physical computing devices. In another embodiment, endpoints 202 are virtualized computing devices executing on physical computing devices. In yet another embodiment, endpoints 202 are collections of computing devices (physical or virtualized) collectively configured to provide access to a network-accessible service. For example, each endpoint 202 may be a collection of devices being a load balancer device configured to load balance requests to the endpoint 202 among the collection of devices. Each endpoint 202 is in communication with the network 108, and thus addressable on the network 108. The number of endpoints 202 may vary, for example, depending on the capacity requirements of the network-accessible service. Illustratively, a service provider for such service may contract with an operator of the data center 110 (e.g., a cloud computing provider) to generate and provision the endpoints 202.

In one embodiment, the number of endpoints 202 may vary according to a present or historical demand for the network-accessible service. To facilitate a varying number of endpoints 202, the data center may include a resource manager 206 (e.g., implemented directly on a physical computing device or as a virtualized device on a host physical computing device) that monitors load of the endpoints 202 (e.g., with respect to requests per second, computing resource usage, response time, etc.), and dynamically adjusts the number of endpoints 202 to maintain load within threshold values. For example, where the endpoints 202 are implemented as virtualized devices, the resource manager 206 may generate and provision new virtualized devices when a current set of endpoints 202 have usage metrics that exceed desired upper usage parameters, and "spin-down" and remove virtualized devices when metrics fall below lower usage parameters. The resource manager 206 may further be configured, on modifying a number of endpoints 202 within the pool 201, to notify the global access points 106 of network address information for endpoints 202 within the pool 201, such that the access points 106 may address traffic to the endpoints 202.

In addition, the data center 110 of FIG. 2 includes a health check device 204, configured to monitor the health of endpoints 202 within the pool 201. Illustratively, the health check device 204 may periodically (e.g., every n seconds) transmit a request to the endpoints 202, and monitor for whether an appropriate response is received. If so, the health check device 204 may consider the endpoint 202 healthy. If not, the health check device 204 may consider the endpoint 202 unhealthy. The health check device 204 may illustratively notify the global access points 106 of unhealthy endpoints 202 to cause the access points 106 to reduce or eliminate routing of traffic to the endpoint 202 while the endpoint 202 is unhealthy. In some instances, the health check device 204 may further be configured to check the health of the global access points 106, the health of endpoints 202 in other data centers 110, or the health of a network path between the health check device 204 and the access points 106. For example, the health check device 204 may periodically transmit information to the access point 106, and monitor a response from the access point 106, network metrics regarding the response (e.g., latency), or the like. The health check device 204 may report this information to the access points 106 to facilitate routing of traffic to endpoints 202A within the data center 110. Illustratively, the health check device 204 may report health information for endpoints 202 to the configuration data store 210 (e.g., a database on the data store 210), which may be propagated to the access points 106 by operation of the configuration manager 208 in the manner described below (e.g., as part of a configuration package or parcel).

The data center 110 of FIG. 2 further includes a configuration manager 208, configured to enable service providers to configure operation of the data centers 110 and global access points 106. Illustratively, the configuration manager 208 may provide an interface through which users may specify endpoints 202 that provide a network-accessible service, configure those endpoints 202 and configure the resource manager 206 to scale up or down endpoints. The configuration manager 208 may further enable service providers to assign global network address to those endpoints, and to specify load-balancing parameters for routing traffic addressed to global network address to various data centers 110. The configurations created by service providers may be stored within a configuration data store 210, which can corresponds to any persistent or substantially persistent storage device (e.g., hard disk drives, solid state drives, network-attached storage devices, etc.). In some instances, the configuration data store 210 may include multiple representations of a configuration of a service provider. For example, to facilitate rapid reconfiguration of global access points 106, the configuration data store 210 may include a database (such as a relational database) that is modified each time a service provider commits a change to their configuration. The configuration manager 208 may periodically (e.g., each 100 milliseconds, 1 second, 2 seconds, 5 seconds, 30 seconds, etc.) determine whether changes have been made to the database, and if so, generate a new configuration package for the global access points 106, which configuration package encompasses the changes to the database (and thus, service provider's configuration) relative to a prior configuration package. The configuration manager 208 may then store the configuration package into the configuration data store 210 for retrieval by the global access points 106. In one embodiment, each global access point 106 is configured to periodically (e.g., each 100 milliseconds, 1 second, 2 seconds, 5 seconds, 30 seconds, etc.) poll the configuration data store 210 to determine whether a new configuration package exists, and if so, to retrieve and implement the package. In some instances, a configuration package may be divided into package "parcels," representing a portion of the configuration. Global access points 106 may be configured to retrieve only those parcels modified with respect to an existing parcel. Modifications may be tracked, for example, based on versioning of parcels or a package. Still further, in some embodiments, packages or parcels may be stored in the data store 210 as differences or "deltas" from a prior version, such that an access point 106 may retrieve only changes since a prior version of the parcel, reducing the data transfer required to update a package or parcel. In one embodiment, the configuration manager 208 may periodically (e.g., each 100 milliseconds, 500 milliseconds, etc.) "checkpoint" packages or parcels, by collecting all changes since a prior checkpoint and storing the package or parcel as a standalone version. Such checkpointing may facilitate rapid reconfiguration in the instance that a global access point 106 has no frame of reference of a prior package or parcel.

In one embodiment, only one data center 110 of the data centers 110A-N of FIG. 1 includes the configuration manager 208, which manager 208 propagates each service provider's configuration to the other data centers 110 and access points 106. In another embodiment, each data center 110 includes a configuration manager 208, and the managers 208 of each data center 110 may communicate to synchronize configurations between the data centers 110 and with the access points 106.

While only some components of the data center 110 are shown as in communication with the network 108, other components may additionally be in communication with the network 108 and/or the network 104. The lines of FIG. 2 are not intended to represent all actual or potential network connections, but rather to illustrate a possible flow of service-related traffic to endpoints 202.

Moreover, while shown within a data center 110, in one embodiment, global access points 106 may also include a configuration manager 208, enabling configuration of the access point 106 directly. In another embodiment, the global access points 106 exclude any configuration manager 208 and data store 210. For example, where access points 106 are implemented at co-tenanted environments (e.g., not operated by or accessible to parties other than an operator of the access points 106), the access points 106 may be configured to exclude any persistent storage, and to instead retrieve configuration information from a data center 110 on initialization of the access point 106. In this manner, security of the access points 106 may be increased, as powering down the access point 106 would be expected to result in loss of any sensitive data that may reside on the access point 106.

While the data center 110 is shown as including one endpoint pool 201, corresponding to one network-accessible service, the data center 110 may host numerous pool 201, each corresponding to a different service. Thus, multiple service providers may utilize a data center 110. Moreover, as noted above, each network-accessible service may be provided by endpoints 202 across multiple data centers 110. Accordingly, the global access points of FIG. 1 may distribute traffic to such a service across the data centers 110.

In accordance with embodiments of the present disclosure, the data center 110 further includes a session handoff manager 212, configured to facilitate adoption of connection-oriented communication sessions with clients 102 initialized at a global access point 106. As discussed above, global access points 106 may in some instances be configured to complete an initialization phase of a connection-oriented communication session, such as the TCP three-way handshake, and to thereafter hand off the communication session to an endpoint 202. In some instances, an endpoint 202 may be configured to accept such a hand off, by receiving context of the connection-oriented communication session (e.g., sequence numbers of both ends of the connection) and generating local state information incorporating that context. The endpoint 202 may be so configured, for example, by modification of networking protocol handlers within an operating system of an endpoint 202 (e.g., by modification of a kernel to accept and adopt TCP context information from a global access point 106). However, it may be preferable that endpoints 202 are not required to be so configured, in order to enable a wide variety of endpoints 202 to utilize global access points 106. To enable this, the data center 110 may also include a session handoff manager 212, which is configured to accept and adopt a connection-oriented communication session from a global access point 106. The session handoff manager 212 may then establish a separate connection-oriented communication session with the endpoint 202 selected by the access point 106 to provide a client device 102 with a service, and operate as a "middle man" between the two sessions. Because the session handoff manager 212 and the endpoint 202 can generally be co-housed within the data center 110, creation of a second connection-oriented communication session can be expected to inject minimal delay into communications between the client device 102 and the endpoint 202.

Figure 3:
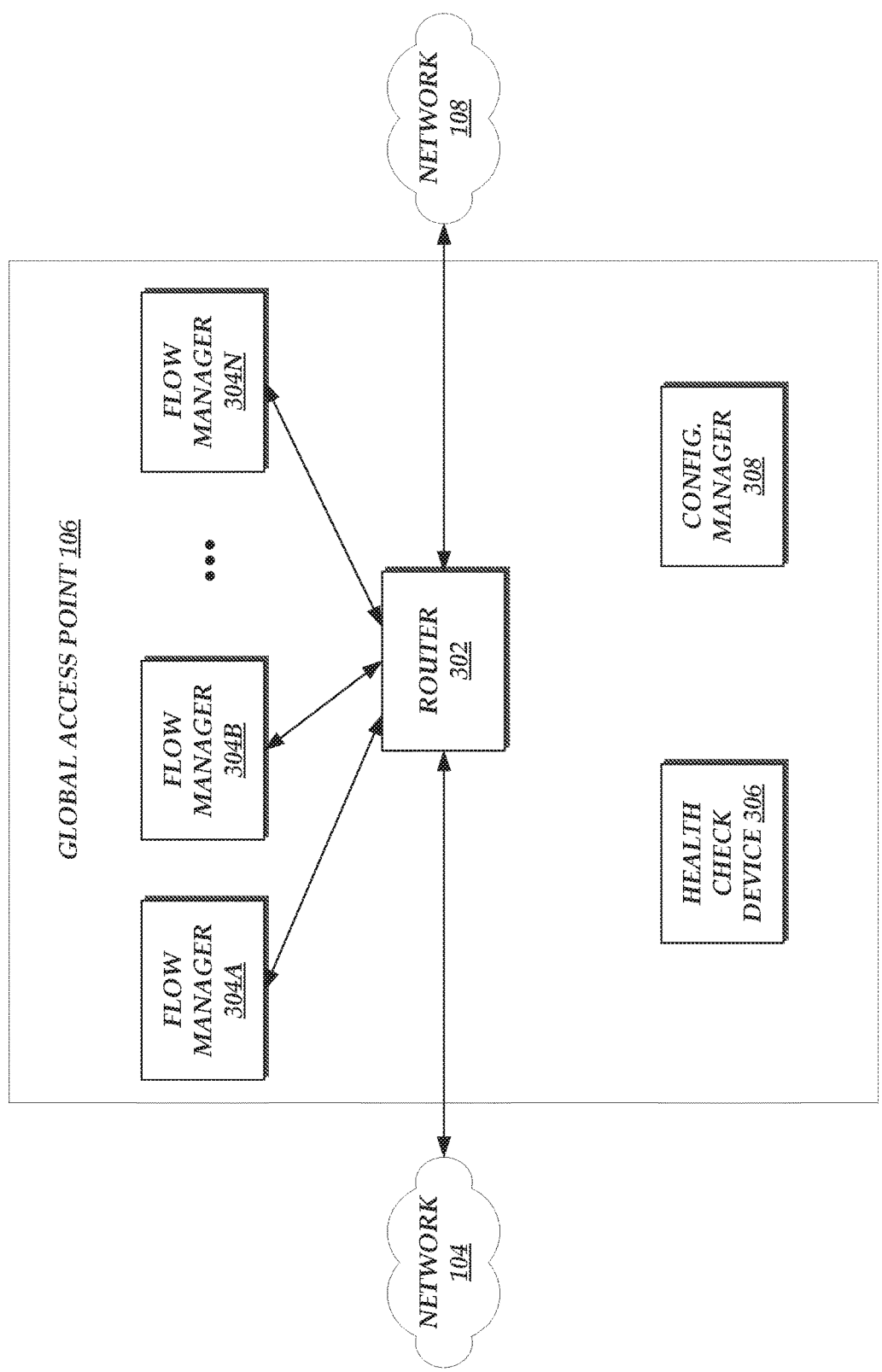
FIG. 3 is a block diagram depicting an illustrative configuration of a global access point of FIG. 1.

FIG. 3 is a block diagram depicting an illustrative configuration of a global access point of FIG. 1. As shown in in FIG. 3, each global access point 106 is in communication with the network 104 via a router 302. While only a single router 302 is shown in FIG. 2, access points 106 may include multiple routers 302. Moreover, while a single connection to the network 104 is shown, each router 302 may include multiple connections to the network 104, potentially to multiple different neighboring devices within the network 104, each of which may correspond to different sub-networks (e.g., autonomous systems (AS's) within the network 104).

As noted above, global access points 106 may be configured to utilize anycast techniques to attract traffic to global network addresses associated with network-accessible services. As such, the router 302 is illustratively configured to advertise the global network addresses to neighboring devices on the network 104. In one embodiment, such advertisements are BGP advertisements. Such advertisements can cause the router 302 to attract traffic addressed to the global network addresses, as the advertisements can cause devices on the network 104 to route traffic addressed to the addresses to the router 302, in accordance with operation of anycast techniques.

As discussed above, the global access point 106 may implement a variety of techniques to increase resiliency of the access point 106. In one embodiment, the global network addresses advertised by the access point 106 are divided into multiple address groups. To decrease the potential effects of failures on the network 104, the router 302 (or multiple routers 302) can be configured to transmit BGP announcements for each address group to different neighboring devices on the network 104 (e.g., different AS's). A network-accessible service may be associated with addresses from multiple address groups, each of which may be provided to client devices 102 as an address at which to access the service. Because address from different groups are advertised differently on the network 104, different routing paths can be expected on the network 104 for addresses of each group. For example, packets addressed to addresses within a first group may reach the router 302 over a first AS of the network 104, while packets addressed to addresses within a second group may reach the router 302 over a second AS. Thus, if a failure were to occur within the first AS (or a downstream AS connected to the first AS), packets addressed to addresses within the second group may be expected to still reach the router 302, and vice versa. As such, dividing global network addresses into multiple groups can increase resiliency of the access points 106 to failures within the network 104.

On receiving a packet addressed to a global network address, the router 302 may route the packet to a flow manager 304, from a set of flow managers 304A-N. While an access point 106 may implement a single flow manager 304, it may be beneficial for an access point to implement multiple flow managers 304 to provide redundant operation of such flow managers 304. The router 302 may use any number of known load-balancing techniques to distribute packets to the flow managers 304, such as round robin selection. In one embodiment, the router 302 utilizes consistent hashing to distribute packets. Consistent hashing is known in the art and will thus not be described in detail herein. Consistent hashing may be beneficial, for example, in increasing the changes that multiple packets with the same characteristics (e.g., source network address, source network port, destination network address, destination network port, protocol) are routed to the same flow manager 304. This may beneficially enable the flow managers 304 to maintain state information regarding flows of packets between a client device 102 and a destination endpoint 202. In some instances, such state information may be required, for example, to implement NAT techniques, or to conduct an initialization phase of a connection-oriented communication session. In another embodiment equal-cost multi-path (ECMP) load balancing is used to route traffic to the flow managers 304A-N. ECMP load balancing is known in the art and thus will not be described in detail herein.

In one embodiment, ECMP load balancing is applied to route packets to the flow managers 304A based on a global network address to which the packet is addressed. Illustratively, each flow manager may handle packets addressed to a subset of addresses within a group of global network addresses. For example, a first flow manager 304 may preferably handle a first quartile of addresses within a group, a second manager 304 may preferably handle a second quartile, etc. By dividing network addresses within a group among different flow managers 304, the access point 106 may for example decrease the portion of services that are adversely effected by improper operation of a flow manager 304, such as due to a misconfiguration of a service associated with an address handled by that flow manager 304. Where multiple groups of global network addresses are used, services may be "shuffled" between different groups, such that two services having addresses sharing a subset under one address group are unlikely to have addresses sharing a subset under another address group. Such shuffling can reduce the total percentage of services made completely unavailable from an access point 106 due to malfunction of an individual flow manager 304A.

To further facilitate use of state information on flow managers 304, the router 302 in one embodiment implements a flow hash routing algorithm, or similar algorithm to identify related packets constituting a "flow" of traffic between a client 102 and an endpoint 202. A variety of flow identification algorithms are known in the art, and thus will not be described in detail herein. Illustratively, the router 302 may implement a flow identification algorithm to recognize flows of data packets, and consistently route packets of the same flow to the same flow manager 304. In one embodiment, the router 302 applies flow-based routing to a data packet prior to otherwise distributing packets to the flow managers 304, such that if the packet is recognized as part of a flow, it is distributed to the same flow manager 304 that previously handled packets of that flow. In such an embodiment, if the packet is not recognized as part of the flow, additional load-balancing algorithms (e.g., consistent hashing) are applied to the packet to determine a flow manager 304 to which to route the packet.

On receiving a data packet, a flow manager 304 may determine a data center 110 to which to route the packet, as well as an endpoint 202 within the data center 110. In one embodiment, the flow manager 304 may apply a combination of criteria to select a data center 110 to which to route a packet, including network performance criteria and load-balancing criteria. For example, a flow manager 304 may, for a given packet, initially select a data center 110 at a minimum network distance (e.g., across the network 108) from the access point 106. Network performance criteria may include, for example, latency, number of hops, bandwidth, or a combination thereof. In general, routing of a packet to a data center 110 with a maximum network performance criteria may beneficially increase the speed of communication between a client device 102 and the data center 110. However, because network performance criteria is unlikely to rapidly shift between an access point 106 and a data center 110, simply routing each packet to a data center 110 with a maximum expected performance criteria may not achieve the load balancing requested by a service provider. As such, each flow manager 304 may further modify an initially selected data center 110, as necessary to achieve the desired load balancing of a service provider. For example, where a service provider desires a maximum of 70% of traffic to be routed to a data center 110 that is closest to an access point 106 in terms of minimized latency or network distance (e.g., number of hops), a flow manager 304 may be configured to route a first 7 packets in a given time period (e.g., each second) to the data center 110, and to route the next 3 packets to an alternative data center 110 (e.g., a second closest data center 110 in terms of network distance, latency, etc.). While percentages are discussed herein as an example load balancing criteria, additional or alternative criteria may be used. For example, a service provider may specify a cap in the total number of packets to be routed to a data center 110.

In another embodiment, rather than initially selecting a data center 110 based on performance criteria between the access point 106 and the data center 110, global access points 106 may be configured to initially select a data center 110 based on performance criteria between the client device 102 from which traffic was received and the initially selected data center 110. Beneficially, use of network performance criteria between client devices 102 and data centers 110 may result in consistent selection of a data center 110 for a given client device 102, regardless of the access point 106 to which the client device's traffic is routed. After selection of an initial data center 110 (e.g., closest to a client device 102 in terms of distance or minimized latency), the access point 106 may modify that selection as required to achieve load-balancing specified by a service provider. For example, if the service provider desired no more than 70% of traffic to be routed to the initially selected data center 110, and the proportion of traffic over a past period of time exceeds that percentage, the access point 106 may select a different data center (e.g., a next most performant data center 110 with respect to the client device 102). The access point 106 may then determine whether the request could be routed to that different data center 110, based on a proportion of historical traffic routed to that different data center 110. This process may continue until the access point 106 locates a data center 110 that is acceptable based on load-balancing specifications of the service provider.

In some embodiments, load balancing is implemented locally at each flow manager 304. In other embodiments, load balancing is implemented across all flow managers 304 of an access point 106. In still other embodiments, load balancing is implemented across flow managers 304 of multiple access points 106. In general, localized load balancing is expected to be less resource intensive, as it requires less communication between distributed components. However, less localized load balancing may result in load balancing criteria more closely resembling that desired by a service provider.

In some instances, flow managers 304 may implement a hybrid of localized and non-localized load balancing. For example, each flow manager 304 may implement localized load balancing (e.g., localized to each manager 304 or each access point 106), and periodically negotiate with other access points 106 to adjust the weights applied when selecting a data center 110. For example, where a service provider requests that traffic be divided evenly between data centers 110, localized load balancing may cause each of two access points 106 to divide traffic evenly between the data centers 110. This may result in less than optimal routing, as half of traffic at each access point 106 may be routed to a non-closest data center 110. Accordingly, in this scenario the access points 106 may communicate regarding their routing of traffic, and assuming for hypothetical sake that the volume of traffic at each point 106 is equal (and that only two access points 106 are considered), each access point 106 may begin to route all of their packets to a nearest data center 110. Such a division would still result in even division of traffic among the data centers 110, and moreover beneficially increase the average network performance metric for each flow of packets.

In one embodiment, a desired proportion or volume of traffic routed to a given data center 110 may be statically selected by a service provider. For example, a service provider may request that no more than 70% of requests at an access point 106 be routed to a given data center 110. In another embodiment, the desired proportion or volume may be dynamic. For example, a service provider may specify that a desired proportion or volume of traffic routed to a given data center 110 increase or decrease from a first point in time to a second point in time, according to a given rate of change (e.g., linearly, exponentially, logarithmically, etc.).

After selecting a data center 110 to which to route traffic, a flow manager 304 may select an endpoint 202 within the data center 110 to which to route the traffic. The endpoint 202 may be selected according to any load balancing algorithm. In one embodiment, the flow manager 304 may utilize consistent hashing to select an endpoint 202.

Similarly to as discussed above with respect to the flow managers 304, it may be desirable for traffic of a given flow to be consistently routed to the same endpoint 202, such that the endpoint 202 may maintain state information regarding that flow. As such, each flow manager 304 may utilize a flow detection algorithm (similarly to as discussed above with respect the router 302) to detect subsequent packets within a flow previously routed by the flow manager 302A to an endpoint 202, and to route such packets to the same endpoint 202. In one embodiment, where a packet is identified by the flow managers 304 as part of an already-routed flow, the flow manager 304 may omit selection of a data center 110 and endpoint 202 for the packet, in favor of routing the packet to the endpoint 202 previously used for prior packets of the flow.

After selecting an endpoint 202 to which to route a packet, a flow manager 304 can modify the packet to facilitate routing to the endpoint 202. For example, a destination network address of the packet, when received at the router 302, may be a global network address. The flow manager 304 may therefore modify the packet to replace the destination network address with a network address of the endpoint 202. In one embodiment, each flow manager 304 implements NAT techniques to modify packets addressed to global network addresses. For example, each flow manager 304 may, for packets bound for endpoints 202, replace a global network address with a network address of an endpoint 202 as the destination network address of the packet, and replace a network address of the client device 102 with an address of access point 106 as a source address. Similar translation may occur for packets from endpoints 202 to be routed to client devices 102, in accordance with NAT techniques. Flow managers 304 may illustratively use port translation (a known NAT technique) to distinguish between translated flows. After translation, the flow manager 304 can return the packet to the router 302 for transmission to the selected endpoint 202 over the network 108.

In another embodiment, a flow manager 304 may utilize encapsulation to route a packet to an endpoint 202. Illustratively, each flow manager 304 may generate an IP "tunnel" to a device within a data center 110, such as the session handoff manager 212 or a router within the data center 110. To route packets to an endpoint 202, a flow manager 304 may encapsulate the packet, and transmit the packet to the receiving device via the tunnel. The receiving device may then decapsulate the packet and transmit the packet to the endpoint 202. In one embodiment, the flow manager 304 replaces a destination address of the packet (e.g., a global network address of the service) with a destination address of the selected endpoint 202 to facilitate transmission of the packet 202 to the endpoint. Encapsulation of packets over a tunnel may provide benefits, such as preservation of the network address of a client device 102 that transmitted the packet. As such, encapsulation may enable, for example, a client device 102 and an endpoint 202 to preserve connection-oriented communication sessions even when packets of a client device 102 are routed through different access points 106. In some instances, flow managers 304 and endpoints 202 (or session handoff managers 212) may be configured to authenticate communications between one another, to ensure authenticity of packets transmitted between the devices. For example, each of the flow managers 304 and endpoints 202 (or session handoff managers 212) may be configured to generate a digital signature authenticating the respective devices, and to include such a digital signature in a header of encapsulated packets flowing between the devices, such that each device can authenticate the digital signature to verify that packets were generated at a known device. As another example, the flow managers 304 and endpoints 202 (or session handoff managers 212) may be configured to communicate via known secure protocols, such as the Transport Layer Security (TLS) protocols.

As noted above, access points 106 may in some instances be configured to conduct an initialization phase of a connection-oriented communication session, to reduce the time needed to conduct such a phase (e.g., due to the relative proximity of the access point 106 to the client device 102 relative to the data center 110). To facilitate such functionality, each flow manager 304 can implement the initialization phase with a client, and provide information related to an initialized session to a device within the data center 110, such as an endpoint 202 or a session handoff manager 212. The information may be provided, for example, via the tunnel. Illustratively, a flow manager 304 may generate a tunnel to the session handoff manager 212, and pass within the tunnel a "TCP handoff" command that includes TCP session state information. The state information may include, for example, a TCP "five-tuple" (five values that often define a TCP connection: source address, source port, destination address, destination port, and the protocol in use) or a portion thereof, and/or sequence numbers of the TCP connection. On receiving the TCP handoff command, the session handoff manager 212 may generate a corresponding entry in its own stateful session table (e.g., TCP table), thus "adopting" the connection-oriented communication session. The flow manager 304 may then transmit packets from the client device 102 via the tunnel, which may be decapsulated and processed at the session handoff manager 212 as part of the adopted session. In embodiments where a session handoff manager 212 is used to accomplish handoff of stateful sessions, flow managers 304 may not be required to select an endpoint 202 to which to transmit a packet. Rather, flow managers 304 may be configured to consistently select an appropriate session handoff manager 212 within a selected data center 110 as a destination for client device 102 packets. The session handoff manager 212, in turn, may select an endpoint 202 within the data center 110. Thus, use of a session handoff manager 212 may shift responsibility for selecting an endpoint 202 from the flow manager 304 to the session handoff manager 212. Selection of an endpoint 202 at a session handoff manager 212 may occur similarly to such selection by a flow manager 304.

In addition to one or more routers 302 and flow managers 304, the global access point 106 of FIG. 2 includes a health check device 306. The health check device 306 may illustratively transmit health checks to flow managers 304 in order to ascertain whether such flow managers 304 are malfunctioning. Transmission of health check data may occur similarly to transmission of health check data by a health check device 204 within a data center 110, as discussed above. Additionally or alternatively, the health check device 306 may transmit health check data to endpoints 202 and/or client devices 102. Health check data received with respect to endpoints 202 may facilitate routing decisions to the endpoint 202. For example, if the health check device 306 is unable to communicate with an endpoint 202, a flow manager 304 may halt selection of the endpoint 202 as a destination for traffic, regardless of whether a health check device 204 local to the endpoint 202 reports the endpoint 202 as healthy. Health check data collected with respect to client devices 102 may illustratively be used to modify availability announcements (e.g., BGP announcements) to devices of the network 104. For example, an operator of the global access points 106 may review client device 102 related health check data to adjust announcements in an attempt to redirect traffic from some devices 102 to a different (e.g., closer) access point 106 than it is currently routed to on the network 104.

The global access point 106 of FIG. 3 further includes a configuration manager 308 configured to receive configuration information related to services associated with global network addresses, and to configure operation of the global access point 106 to implement such configuration. For example, the configuration manager 308 may receive information as to how the router 302 should advertise global network addresses to the network 104, information mapping services made available at the data centers 110 to global network addresses routed by the access points 106, information identifying data centers 110 and endpoints 202 of such services, information specifying a desired load-balancing among such data centers 110, and the like. In one embodiment, the configuration manager 308 retrieves configuration information from a configuration data store 210 within a data center 110. For example, the configuration manager 308 may periodically poll the data store 210 for new configuration information. As another example, a data center 110 may "push" changes in configuration to the configuration manager 308, utilizing a variety of known push notification techniques. For example, a data center 110 may implement a publish-subscribe ("pub/sub") messaging system, and a configuration manager 208 may publish changes to a service provider's configuration to the system. The system may then notify the configuration managers 308 of the access points 106 of such changes. Thus, as service providers modify configuration of their services and global network addresses at a data center 110, such modifications may be propagated to the access points 106. In one embodiment, access points 106 do not store configuration information in persistent storage (and may lack any such persistent storage) in order to reduce a likelihood that such information might be obtained from the access points 106.

While examples are discussed above with respect to a network-accessible service, each access point server 402 may be associated with multiple services. For example, where each flow manager 304 is tasked with handling packets addressed to a subset of global network addresses within a group of such addresses, each flow manager 304 may as a consequence handle traffic addressed to any service associated with a global network address within that subset.

While only some components of the access points 106 are shown as in communication with the networks 104 and 108, other components may additionally be in communication with the network 108 and/or the network 104. The lines of FIG. 3 are not intended to represent all actual or potential network connections, but rather to illustrate a possible flow of service-related traffic through an access point 106.

The data center 110 of FIG. 2 and the global access point 106 of FIG. 3 are as operating in a distributed computing environment including one or more computer systems that are interconnected using one or more computer networks (not in the respective figures). The data center 110 of FIG. 2 and the global access point 106 of FIG. 3 could also operate within a computing environment having a fewer or greater number of devices than are illustrated in the respective figures. Thus, the depictions of the data center 110 of FIG. 2 and the global access point 106 of FIG. 3 should be taken as illustrative and not limiting to the present disclosure. For example, data center 110 of FIG. 2, the global access point 106 of FIG. 3, or various constituents thereof, could implement various Web services components, hosted or "cloud" computing environments, and/or peer to peer network configurations to implement at least a portion of the processes described herein.

Figure 4:
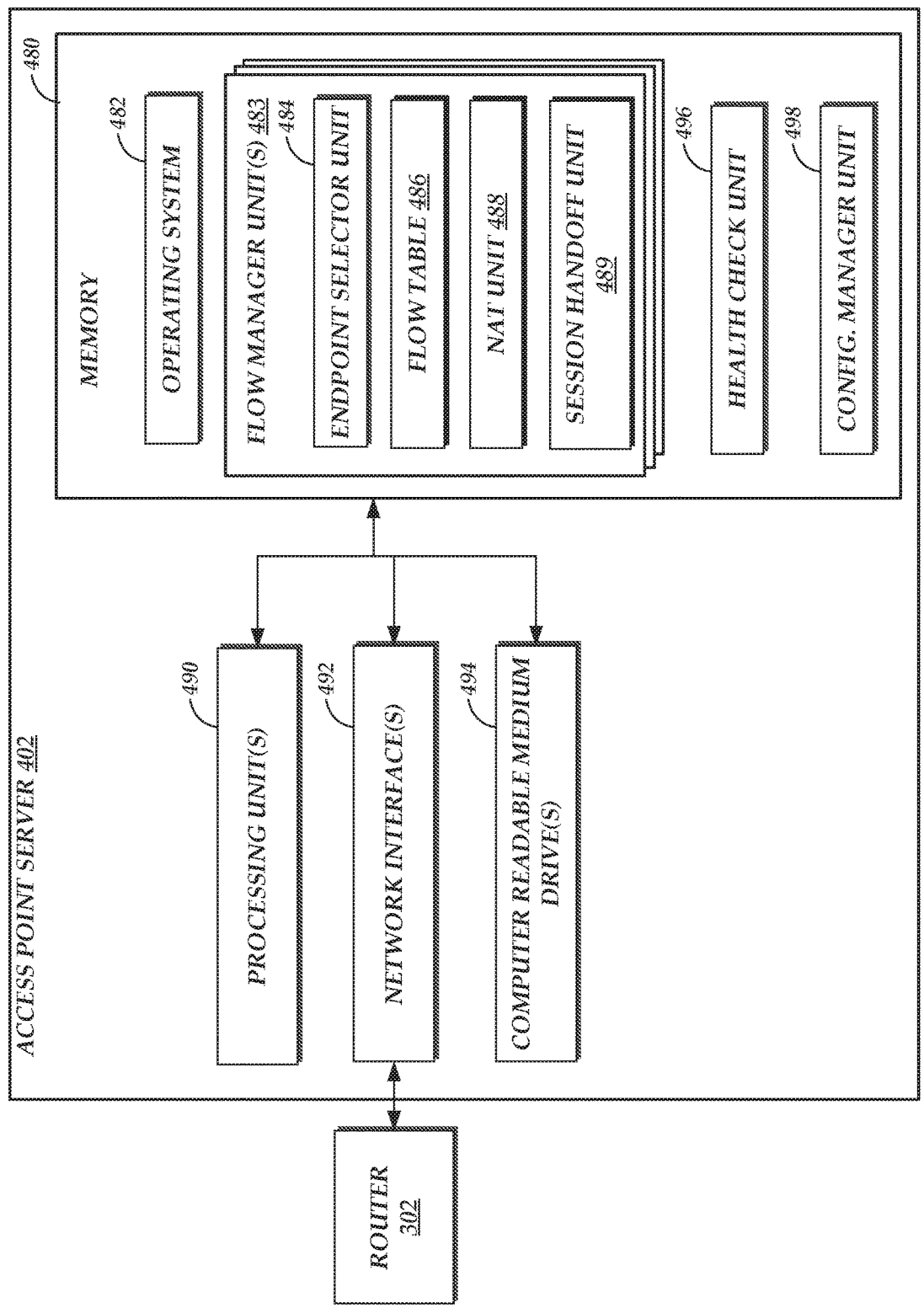
FIG. 4 is a block diagram depicting an illustrative configuration of a flow manager server implementing one or more flow managers within a global access point of FIG. 1.

FIG. 4 depicts a general architecture of an example computing system (referenced as an access point server 402) that operates to implement flow managers 304 of an access point 106. The general architecture of the access point server 402 depicted in FIG. 4 includes an arrangement of computer hardware and software modules that may be used to implement aspects of the present disclosure. The hardware modules may be implemented with physical electronic devices, as discussed in greater detail below. The access point server 402 may include many more (or fewer) elements than those shown in FIG. 4. It is not necessary, however, that all of these generally conventional elements be shown in order to provide an enabling disclosure. Additionally, the general architecture illustrated in FIG. 4 may be used to implement one or more of the other components illustrated in FIGS. 2 and 3. As illustrated, the access point server 402 includes one or more processing units 490, one or more network interface 492, and one or more computer readable medium drives 494, all of which may communicate with one another by way of a communication bus. The network interfaces 492 may provide connectivity to one or more networks or computing systems, such as the router 302 (which may correspond, for example, to a commercially available router device). The processing units 490 may thus receive information and instructions from other computing systems or services via networks, such as network 104 or 108. The processing unit 490 may also communicate to and from memory 480.

The memory 480 may contain computer program instructions (grouped as modules in some embodiments) that the processing unit 490 executes in order to implement one or more aspects of the present disclosure. The memory 480 generally includes random access memory (RAM), read only memory (ROM) and/or other persistent, auxiliary or non-transitory computer readable media. The memory 480 may store an operating system 482 that provides computer program instructions for use by the processing unit 490 in the general administration and operation of the access point server 402. The memory 480 may further include computer program instructions and other information for implementing aspects of the present disclosure. For example, in one embodiment, the memory 480 includes one or more flow manager units 483, each of which represents code executing to implement a flow manager 304 of FIG. 3. Each flow manager unit 483 may illustratively be isolated from other units 483 on the server 402. For example, each unit may represent a separate virtual machine or isolated software container. In some instances, each unit 483 may be associated with separate processing units 490, interfaces 492, or drives 494, minimizing potential for operation of one unit 483 to impact operation of another unit 483. Each unit 483 illustratively includes an endpoint selector unit 484, representing code executable to select an endpoint 202 to which to route a packet addressed to a global network address, a flow table 486 representing a table of information mapping flows of packets to endpoints 202, a NAT unit 488 representing code executable to perform NAT on packets addressed to global network addresses, or responses to such packets from endpoints 202, and a session handoff unit 489 representing code executable to conduct an initialization phase of a connection-oriented communication session, and to handoff that session to a receiving device. While not shown in FIG. 4, the memory 480 also illustratively includes an encapsulation unit representing code executable to generate a tunnel connection to another device enabling transmission of encapsulated packets, and to conduct encapsulation/decapsulation to facilitate such transmission.

The memory 480 may further include a health check unit 496, corresponding to instructions executable to implement the health check device of 306, and a configuration manager unit 498, corresponding to instructions executable to implement the configuration manager 308. In some embodiments, the health check device of 306 and configuration manager 308 may be implemented as standalone devices, rather than as part of the access point server 402. Moreover, while shown as distinct from the access point server 402, the router 302 may in some instances be incorporated into the server 402 (e.g., by including in memory 480 software executable to implement routing functionality).

In one embodiment, the access point server 402 lacks any non-volatile memory, and is configured to operate solely with respect to volatile memory, such as RAM. Illustratively, the access point server 402 may be configured to use a pre-boot execution environment (PXE) such that, on initialization, the access point server 402 retrieves from a network-accessible storage location (e.g., the configuration data store 210) at least a portion of the contents of the memory 480, such as the operating system 482, health check unit 496, and configuration manager unit 498. The configuration manager unit 498 may thereafter retrieve additional configuration information from a network-accessible storage location, such as configuration for individual services and associated global network addresses, and utilize such additional information to generate flow manager units 483. To prevent unauthorized disclosure of the contents of memory 480, authentication of the server 402 at the storage location may be linked at least partly to a network location of the server 402 (e.g., at an access point 106), such that attempts to physically relocate the server 402 result in a failure to retrieve the contents of memory 408.

While FIG. 4 depicts a single server 402 and router 302, in some instances a global access point 106 may be implemented by multiple servers 402 and/or routers 302. In some instances, such servers 402 or routers 302 may be physically or logically isolated, to avoid propagation of errors between such servers 402 or routers 302. Illustratively, where an access point 106 handles multiple pools of network addresses, each pool may be handled by a distinct server 402 and router 302. Thus, should one router 302 and/or server 402 fail, only services associated with the pool handled by that router 302 and/or server 402 would be expected to be affected.

Figure 5:
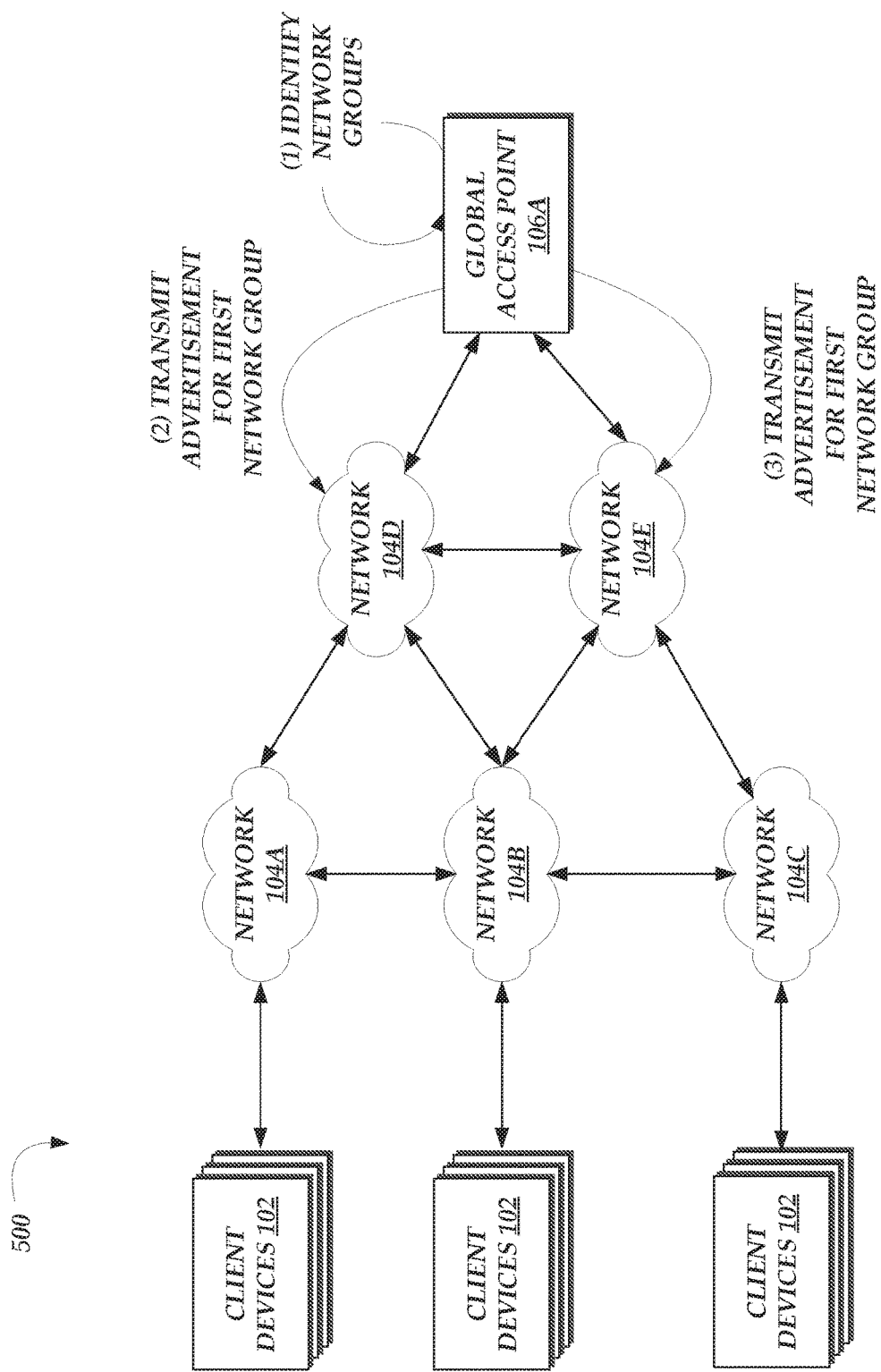
FIG. 5 depicts illustrative interactions for routing a request from a client device addressed to a global network address to a global access point of FIG. 1.

With reference to FIG. 5, illustrative interactions will be described that depict how an individual global access point 106A may operate resiliently, by providing multiple routes to reach a network-accessible service utilizing global network addresses. FIG. 5 depicts an environment 500, which may in turn represent an embodiment of a portion of the environment 100 of FIG. 1. Specifically, in the environment 500, the network 104 is divided into networks 104A-E, each of which may represent, for example, an autonomous system. The networks 104A-C are illustrated as in communication with client devices 102. These network 104A-C may represent, for example, Internet service providers (ISPs) of client devices 102. Networks 104D and E represent other AS's to which the global access point 106A has a network connection. While networks 104D and E are not shown in FIG. 5 as connected to client devices 102, such networks may also act as ISPs to client devices 102. Each of the networks 104A-E is shown in FIG. 5 as interconnected to other networks 104A-E. This configuration is illustrative, and may vary across implementations.

In the illustration of FIG. 5, client devices 102 generally have two routes through which to reach the global access point 106A: via network 104D and 104E. To increase the resiliency of access to the global access point 106A, the access point 106A may selectively transmit availability announcements to the networks 104D and 104E. Specifically, as shown in FIG. 5, at (1), a global access point 106A may identify at least two groups of global network addresses, such as two contiguous range of network addresses. Thereafter, rather than advertising all global network addresses to both network 104D and E, the global access point 106A, at (2), transmits an advertisement (e.g., a BGP announcement) for the first network group to the network 104D. Similarly, at (3), the global access point 106A transmits an advertisement (e.g., a BGP announcement) for the second network group to the network 104E. In this way, traffic addressed to addresses within the first network group are likely to arrive at the access point 106A through network 104D, and traffic addressed to addresses within the second network group are likely to arrive at the access point 106A through network 104E. Each service may be associated with a global network addresses of at least two groups. Thus, if errors or issues occur on the either of the networks 104D or E, a client device 102 may utilize an alternative global network address of a service in order to access the global access point 106A through the remaining network.

Figure 6:
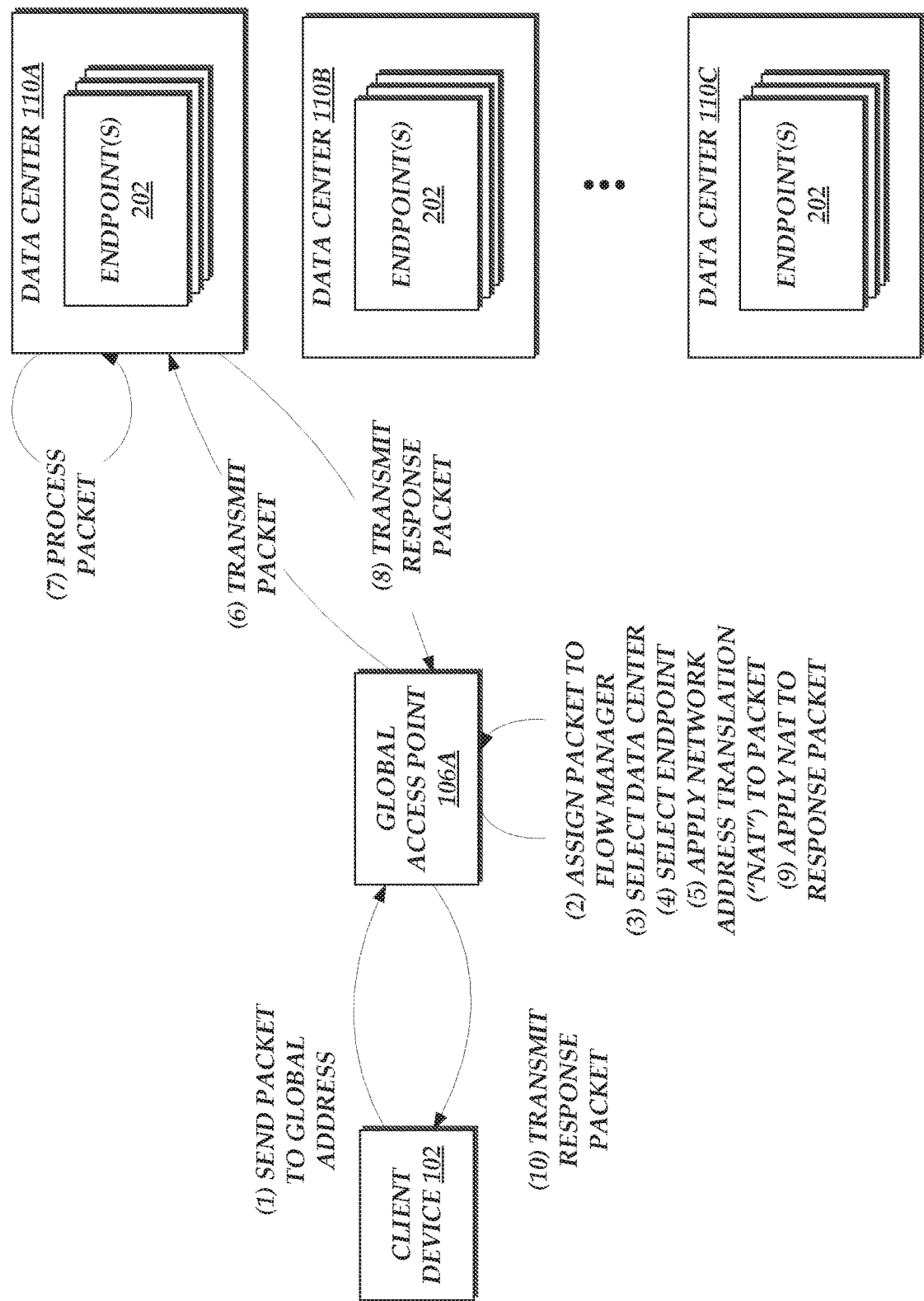
FIG. 6 depicts illustrative interactions for routing a request from a global access point to a data center of FIG. 1, based at least partly on load-balancing requests among the data centers.

With reference to FIG. 6, illustrative interactions will be described for operation of a global access point 106 to facilitate communication between a client device 102 and a data center 110 providing endpoints 202 for a network-accessible service. The interactions of FIG. 6 begin at (1), where a client device 102 transmits a data packet to the global access point 106A, addressed to a global network address associated with the global access point 106A. The data packet may, for example, be formatted in accordance with the Transmission Control Protocol (TCP), the user datagram protocol (UDP), or the Internet Control Message Protocol (ICMP). The data packet may be transmitted via the network 104, and routed to the global access point 106A via operation of the network 104, based on advertisements of the global access point 106A indicating that the global network address to which the packet is addressed is available via the global access point 106A. For example, the global access point 106A may be a nearest (e.g., in network distance terms) global access point 106 to the client device 102.

On receiving the data packet, a router 302 within the global access point 106A assigns the packet to a flow manager 304 within the access point 106. Where the data packet is not associated with an existing data flow, the router 302 may utilize ECMP load balancing to assign the data packet to a flow manager 304 based on the network address to which the packet is addressed. Where the data packet is associated with an existing data flow, the router 302 may route the packet to the same flow manager 304 to which prior packets in the flow were routed.

At (2), the flow manager 304 within the access point 106A assigns the data packet to a data center 110. Where the data packet is not associated with an existing data flow, the flow manager 304 may apply a load balancing algorithm to the data packet, to select a data center 110 from the set of available data centers 110. The algorithm may include, for example, initially selecting a data center 110 that is most performant with respect to the client device 102 (or, alternatively, the global access point 106A) in terms of network performance criteria, and selecting an alternative data center 110 (e.g., a next most performant) if the nearest data center 110 has received greater than a threshold amount (e.g., in absolute amount or percentage) or data packets over a past period of time. In one embodiment, each access point 106A implements the same algorithm when selecting a data center 110, based on current information related to performance criteria between client devices 102 and data centers 110. Moreover, a common set of performance criteria may be made available to each access point 106 (e.g., from within configuration data store 210). Thus, absent a change in performance criteria or load of data centers 110, routing of client device 102 data packets to a data center 110 may be consistent among access points 106. In this manner, even when data packets of a client device 102 are rerouted to a different access point 106, they may be routed to the same data center 110. Where the data packet is associated with an existing data flow, the flow manager 304 may route the packet to the same data center 110 to which prior packets within the flow were routed.

After selecting a data center 110, the flow manager 304 may select an endpoint 202 within the selected data center 120. The flow manager 304 may illustratively maintain, for a given data center 110, a set of endpoints 202 providing a network accessible service associated with the global network address to which the data packet was addressed. In one embodiment, this set of endpoints 202 may be identified based on information received from a resource manager 206 within the data center 110. The flow manager 304 may further maintain information as to the apparent health of the endpoints 202, as obtained from a health check device 204 within the data center 110, a health check device 306 within the access point 106A, or both. The flow manager 304 may thus select from a set of endpoints 202 a healthy endpoint for the service associated with the network address to which a packet was addressed. The flow manager 304 may utilize any of a number of known load balancing algorithms, such as consistent hashing, to distribute packets between endpoints 202. Where a packet is associated with an existing packet flow, the flow manager 304 may select the same endpoint 202 to which prior packets in the flow have been routed.

After selecting an endpoint, the flow manager 304 within the access point 106A modifies the packet as necessary to route the packet to the selected endpoint 202. Specifically, in the embodiment of FIG. 6, the flow manager 304 at (5) applies NAT techniques to the packet, such as by replacing source and destination network addresses of the packet. Thereafter, at (6), the flow manager 304 transmits the packet to selected endpoint 202 within the selected data center 110.

At (7), the endpoint 202 processes the packet in accordance with the network-accessible service. The endpoint 202 then returns a response packet to the global access point 106A. As the response packet is associated with an existing data flow, the router 302 within the access point 106A directs the response packet the same flow manager 304 discussed above. The flow manager 304 reverses the previous NAT transformation, in order to address the packet to the client device 102. The flow manager 304 then returns the data packet to the client 102. Thus, via the interactions of FIG. 6, a client device 102 may address a data packet to a global network address, and be routed (via a global access point 106) to an endpoint providing a network-accessible service related to the network address. The access point 106 may apply load-balancing to packets, such that load on the service is distributed among data centers 110, in accordance with a desired configuration of a service provider.

Figure 7:
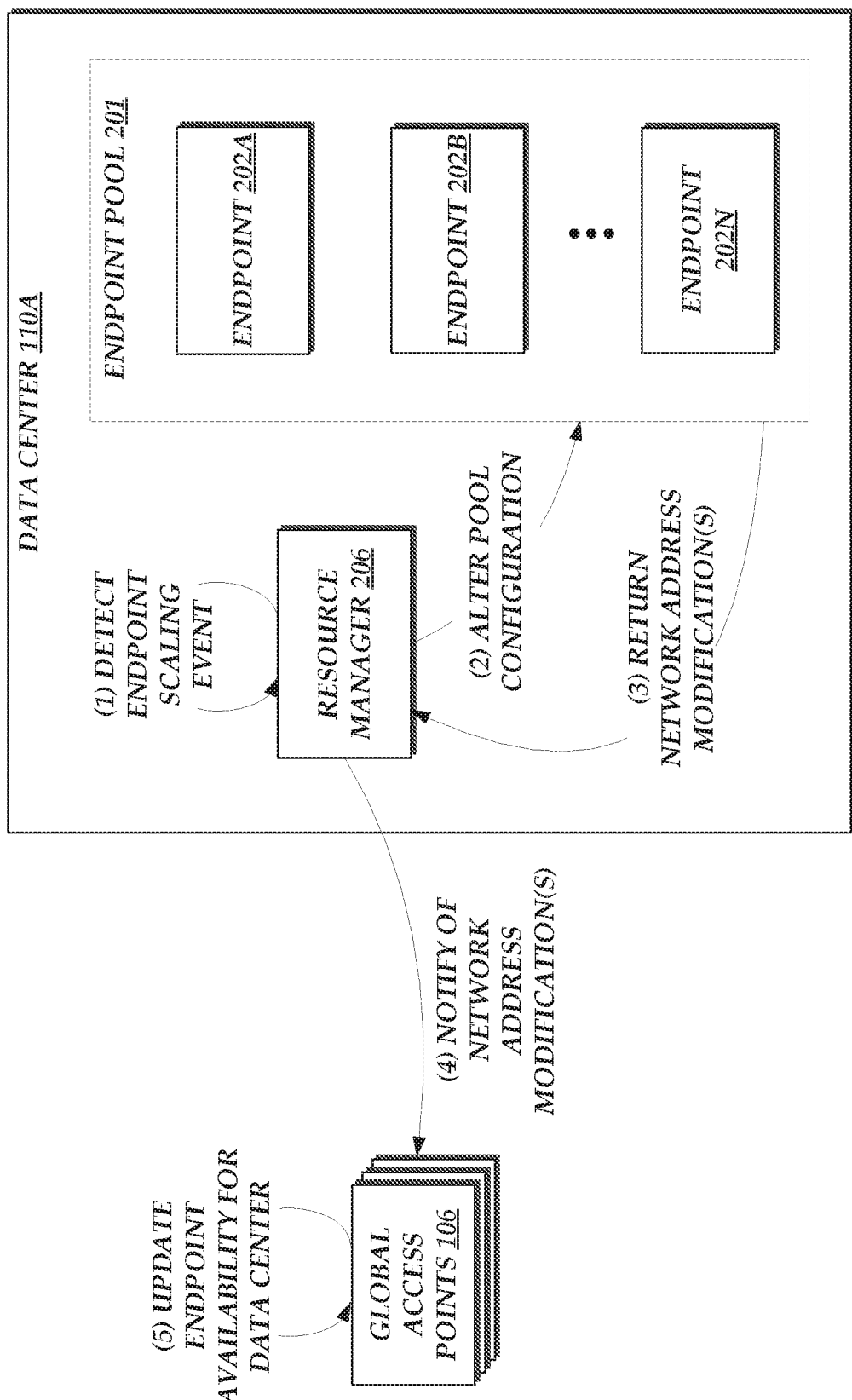
FIG. 7 depicts illustrative interactions for propagating endpoint information from a data center to global access points of FIG. 1, such that the access points may correctly route traffic from client devices addressed to global network addresses.

With reference to FIG. 7, illustrative interactions will be described for propagating endpoint information from a data center 110A to global access points 106, such that the access points 106 may correctly route traffic from client devices 102 addressed to global network addresses. The interactions of FIG. 7 will be described with respect to a single data center 110A. However, similar interactions may occur with respect to other data centers 110, potentially concurrently.

The interactions of FIG. 7 begin at (1), where the resource manager 206 of a data center 110A detects an endpoint scaling event within the endpoint pool 201. An endpoint scaling event illustratively corresponds to a "scale up" or "scale down" event, indicating an addition or removal of an endpoint 202 from the pool 201. In some instances, a scaling event may also include replacement of an endpoint 202 in the pool 201. Scaling events may illustratively occur due to load on the pool 201 falling outside of desired threshold values, or due to malfunction of an endpoint 202 within the pool 201. At (2), the resource manager 206 transmits instructions to the pool 201 to alter the pools configuration, in accordance with the scaling event. For example, the resource manager 206 may instruct the pool 201 to add a new endpoint 202, remove an existing endpoint 202, or a combination thereof. Illustratively, scaling the pool 201 may include transmitting instructions to a host device to add or remove a virtual machine instance executing software corresponding to the endpoint 202 (e.g., making available a network-accessible service related to the pool 201).

At (3), the pool 201 notifies the resource manager 206 of modifications to the pool 201, including for example network addresses of any endpoints 202 added to the pool 201. The resource manager 206, at (4), notifies the configuration manager 208 of any network address modifications to the pool 201. A variety of techniques may be utilized in accordance with the present disclosure to facilitate transmission of information between the resource manager 206 and the configuration manager 208. Preferably, such communication will occur rapidly (e.g., within milliseconds or seconds), such that future requests to access a network-accessible service are routed to an available endpoint 202, as opposed to a failed or unavailable endpoint 202. In one embodiment, this rapid communication is facilitated by a pub/sub messaging system, a stream-data processing system, or a combination thereof. Illustratively, the resource manager 206 may publish modifications to the endpoints 202 of a pool 201 within a message stream associated with the network-accessible service provided by the pool 201. The configuration manager 208 may be configured to retrieve new messages to the stream, either by periodically polling for such messages (e.g., at a frequency of every 1 second, 2 seconds, 3 seconds, etc.) or by receiving "push" notifications for such messages by the message-handling system. Use of a pub/sub messaging system or stream-data processing system may beneficially provide highly resilient, rapid messaging between the resource manager 206 and the configuration manager 208. While described with reference to changes to network addresses, a pub/sub messaging system or stream-data processing system may be used to facilitate communication regarding other changes to configuration of global access points 106.

On detecting a change to the network addresses of the pool 201, the configuration manager 208 may modify a configuration of the global access points 106 to reflect those changes, as detailed below. While the interactions below are described with reference to alterations of network addresses within a pool 201, the same or similar interactions may be utilized to propagate other configuration changes to access points 106.

Specifically, at (5), after being determining a change in network address of endpoints 202 within the pool 201, the configuration manager 208 builds a modified configuration package (or parcel within a package) for the global access points 106. The modified configuration package (or parcel) may illustratively reflect the changes to the network addresses of the pool 201, as well as any other changes to configuration of the global access points 106 since a last build of the configuration package (or parcel). In one embodiment, the configuration package (or parcel) reflects only a change since a last version of the package (or parcel). In another embodiment, the package (or parcel) reflects all relevant configuration information in the package (or parcel). At (6), the configuration manager 208 stores the modified configuration package (or parcel) in the data store 210 for retrieval by the global access points 106.

As noted above, in one embodiment, each global access point 106 is configured to periodically poll the configuration data store 210 for changes to its configuration package (or parcels thereof). Thus, at (7), each global access point 106 can determine that a modified package (or parcel) exists in the data store 210, and retrieve that package (or parcel). Each access point 106 can then, at (8), update its configuration (e.g., with the changes to network addresses within the pool 201), such that future requests are routed to a correct endpoint 202 within the pool 201. The illustrative interactions of FIG. 7 can thus facilitate rapid modification to the configuration of global access points 106, such as in response to modification of endpoint pools 201.

Figure 8:
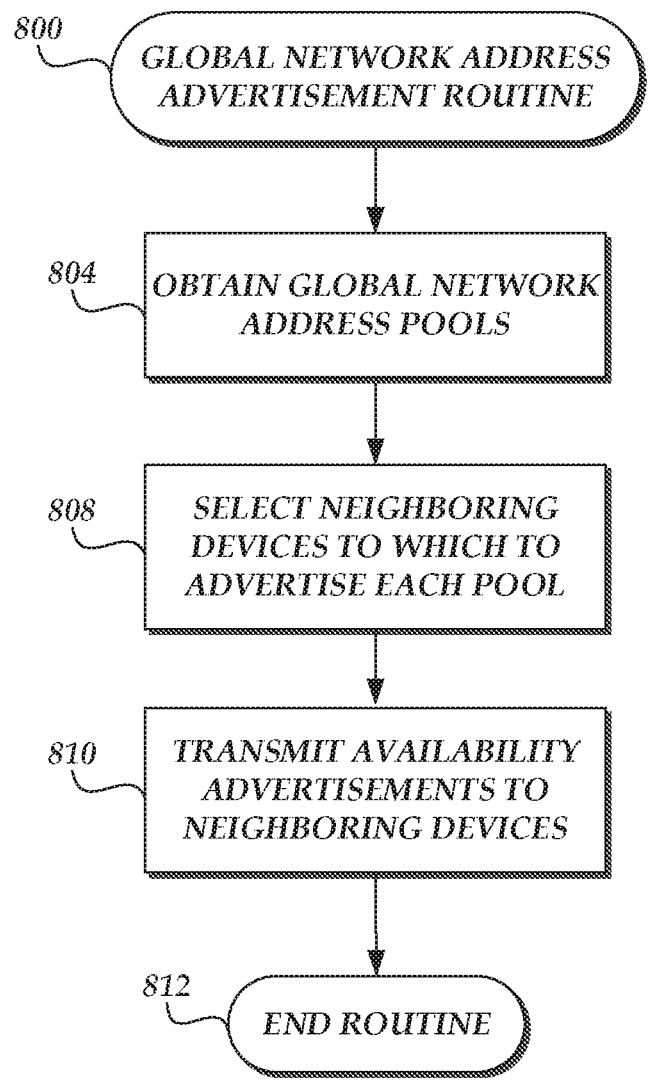
FIG. 8 depicts an illustrative routine for increasing resiliency of global network addresses, by selecting different neighboring devices to which to advertise different global network addresses from access points of FIG. 1.

With reference to FIG. 8, an illustrative routine 800 will be described for increasing resiliency of global network addresses, by selecting advertisement of addresses to different neighboring devices. The routine 800 may illustratively be implemented by a global access point 106 (e.g., during initialization of the access point 106). In one embodiment, an instance of the routine 800 is implemented by each access point 106.

The routine 800 begins at block 804, where global network addresses to be serviced via the access point 106 are obtained. This information may illustratively be obtained as part of a configuration of the access point 106, such as within a configuration file stored in a configuration data store 210, obtained during initialization of the access point 106. The global network addresses may be illustratively divided in the configuration into different addressing pools. For example, each pool may include a different "block" of network addresses, such as a contiguous range of addresses. Ranges may represent "subnets" for example. In one embodiment, ranges are represented by a "prefix," denoting the first n bits of network addresses in the range. For example, the prefix of 192.0.2.0/24 (expressed in Classless Inter-Domain Routing, or CIDR) may represent the first 24 bits of an IPv4 address, corresponding to addresses in the range of 192.0.2.0 to 192.0.2.255.

At block 808, the access point 106 selects neighboring devices to which to advertise each pool of network addresses. Generally, the available pools may be divided among available neighboring devices, in order to provide different network paths from which to reach the access point. In one embodiment, such election is based on a specification within the configuration of the access point 106. In another embodiment, such selection is determined by the access point 106. Illustratively, the access point 106 may divide the pools evenly among available neighboring devices (which may be discovered, e.g., through typical routing protocols). In some instances, neighboring devices may additionally be determined based on preferred routing of traffic. For example, an access point 106 may be configured not to advertise a given network address pool on a given neighboring device, in order to cause that neighboring device to route requests for addresses within the pool to an alternative access point 106.

Thereafter, at block 810, the global access point 106 transmits to the relevant neighboring devices availability announcements for the respective pools of network addresses. The announcements may, for example, be BGP protocol announcements. Transmission of BGP protocol announcements generally is known within the art, and thus will not be described in detail herein.

As described above, the division of global network address into pools, and advertisement of such pools to different neighboring devices, may beneficially increase the resiliency of access points 106, particularly to outages or errors on neighboring networks. Specifically, because each network-accessible service may be associated with global network addresses of different pools (e.g., one for each pool), client devices 102 of a service may be made aware (e.g., via DNS) of multiple routes for reaching the service. This technique may further increase the resiliency of access points 106 to limited outages at the access points 106, such as outages of a network interface or router connected to a neighboring network. As noted above, in one embodiment, the resiliency of each service is further increased by dividing each pool into network address subsets, which may be in turn distributed among flow managers 304 of an access point 106. The associations between services and each subset may be "shuffled" among pools. For example, the global network address for a service in a given pool may be randomly selected, or may be selected via a varied selection mechanism for each pool. This may cause the groupings of services within subsets to be "shuffled" among the pools. In this manner, if an individual service's configuration is problematic to other services within the subset, the other services affected by that misconfiguration are likely to vary among pools. Because each service may be expected to be accessible via addresses in multiple pools, client devices 102 may connect to each other service via an alternative address of an alternative pool, thereby bypassing the problematic subset and pool. This shuffling mechanism can therefore greatly increase resiliency of services using global network addresses.

Figure 9:
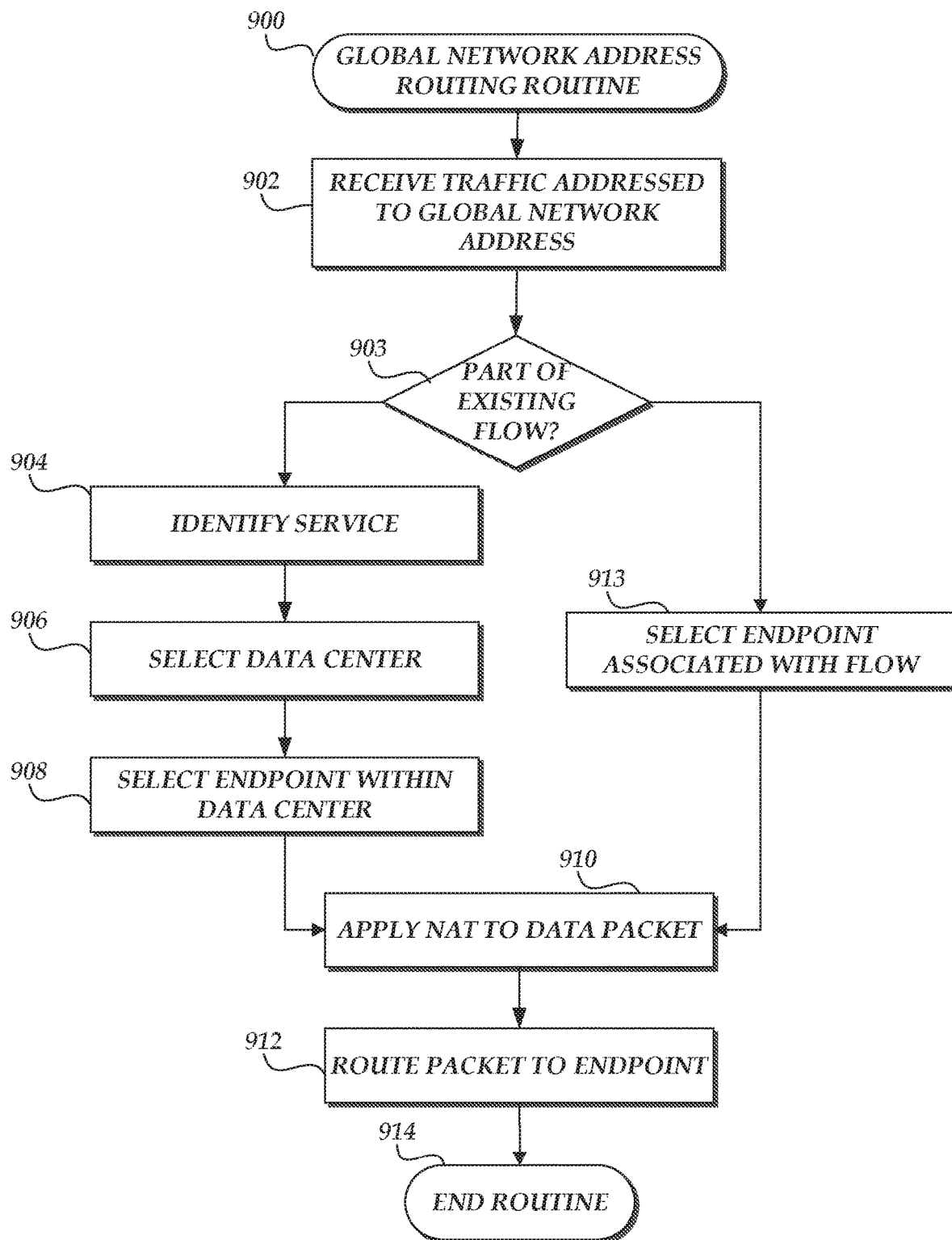
FIG. 9 depicts an illustrative routine for routing traffic addressed to a global network address associated with a service provided by endpoints within data centers, by use of the access points of FIG. 1.

With reference to FIG. 9, an illustrative routine 900 will be described for routing traffic addressed to a global network address associated with a service provided by endpoints 202 within data centers 110. The routine 900 may illustratively be implemented by a flow manager 304 within an access point 106. In one embodiment, an instance of the routine 900 is implemented by each flow manager 304 of each access point 106.

The routine 900 begins at block 902, wherein the flow manager 304 receives a data packet addressed to a global network addresses advertised as accessible at the access point 106. The data packet may, for example, represent a request to access a network-accessible service made available via the network address. In one example, the data packet is formatted as a TCP or UDP data packet.

At block 903, the routine 900 varies according to whether the data packet is associated with an existing packet flow, as determined at block 903. Illustratively, the access point 106 may compare attributes of the data packet to attributes of prior packets, to determine whether the new data packet is within a same flow of communication as a prior packet. Any number of flow identification techniques, a variety of which are known in the art, may be used to determine whether a data packet is within an existing flow.

If the packet is part of an existing flow, the routine 900 proceeds to block 913, where the flow manager 304 selects as an endpoint 202 for the packet the same endpoint 202 selected for previous packets within the flow. In one embodiment, each flow manager 304 may maintain a cache in memory associating flows to endpoints 202, facilitating this selection.

If the packet is not part of an existing flow, the routine 900 proceeds to block 904, where the flow manager 304 identifies the network-accessible service associated with the network address to which the packet is addressed. The flow manager 304 may illustratively access information mapping network addresses to associated services (e.g., as maintained in memory of the access point 106) to identify the service associated with the address.

Thereafter, at block 906, the access point 106 selects a data center 110 providing the network-accessible service. In one embodiment, the data center 110 is selected at least partly based on network performance criteria between the access point 106 and the data center 110, as well as a load balancing configuration for the network-accessible service. Illustratively, the flow manager 304 may initially select a most performant (in terms of a given network performance criteria with respect to the client device 102 or the access point 106) data center 110. The flow manager 304 may then determine whether a proportion of packets routed to the data center 110 over a past period (e.g., 1 minute, 5 minutes, 30 minutes, etc.) exceeds a threshold desired maximum for the data center 110, based on a desired load balancing across data centers 110 for the service. In one embodiment, the threshold desired maximum may be specified, for example, by a service provider, such as via a desired percentage of traffic to be routed to each data center 110. In another embodiment, the threshold desired maximum may be determined cooperatively by multiple access points 106, such that the combined thresholds of each access point 106 achieve the desired division of a service provider between data centers 110. For example, access points 106 may implement a peer-to-peer algorithm that aggregates traffic volumes to a service across the access points 106 and determines an optimal routing for each data packet based on the access point 106 to the packet was addressed (and corresponding network performance criteria to each data center 110). The algorithm may then modify the optimal routing for each access point 106 as necessary to implement globally optimized routing, resulting in an individualized desired proportion between data centers 110 for each access point 106. Each access point 106 may thus implement this individualized desired proportion to determine whether a proportion of packets routed to the initially selected data center 110 over a past period (e.g., 1 minute, 5 minutes, 30 minutes, etc.) exceeds a threshold desired maximum for the data center 110. If so, the access point may modify the initial selection to an alternative data center, such as a next closest data center. In one embodiment, implementation of block 906 repeats for each data center 110 selected, to ensure that no data center receives greater than a desired maximum proportion or volume of data packets.

After selecting a data center 110, the flow manager 304 selects an endpoint 202 within the data center 110 to which to route the data packet. In one embodiment, the flow manager 304 may utilize consistent hashing to select an endpoint 202, based on an attribute of the packet (e.g., source IP address).

Thereafter, at block 910, the flow manager 304 applies NAT to the data packet. Illustratively, the flow manager 304 may replace a source address of the data packet with an address of the global access point 106 (e.g., a unicast address, as opposed to a global network address), and replace a destination address with an address of the endpoint 202 (which may also be a unicast address of the endpoint 202). The flow manager 304 may also, for example, modify a port number of the packet, to facilitate later application of NAT techniques to packets within the flow. The flow manager 304 may then transmit the packet to the selected endpoint 202. The routine 900 may then end at block 914.

Various modifications to the routine 900 are contemplated herein. For example, while the routine 900 includes three blocks related to selection of an endpoint 202 for packets not associated with an existing flow (blocks 904, 906, or 908), some implementations of the routine 900 may exclude one or more of these blocks. Illustratively, rather than separately identifying a service and data centers related to that service, a flow manager 304 may maintain data mapping a network address to data centers 110 and endpoints 202 associated with the address. The flow manager 304 may then select a data center 110 based on the criteria described above, without the need to directly identify the service associated with the address. In other embodiments, the flow manager 304 may maintain only data associating network addresses to corresponding endpoints 202, and may select an endpoint 202 for a packet directly, without first identifying the service associated with the address or a data center 110 providing the service. For example, each endpoint 202 may be selected in a manner similarly to the data centers 110 described above, by selecting an endpoint 202 with a best performance criteria value, and modifying that selection if the endpoint 202 is receiving more than a desired proportion of volume of data. Moreover, while the routine 900 is shown in FIG. 9 as ending at block 914, a flow manager 304 may continue to undertake other actions subsequent to the routine 900, such as acting as a NAT device for communications between client devices 102 and endpoints 202. Thus, the depiction of the routine 900 in FIG. 9 is one embodiment of the concepts disclosed herein.

Figure 10:
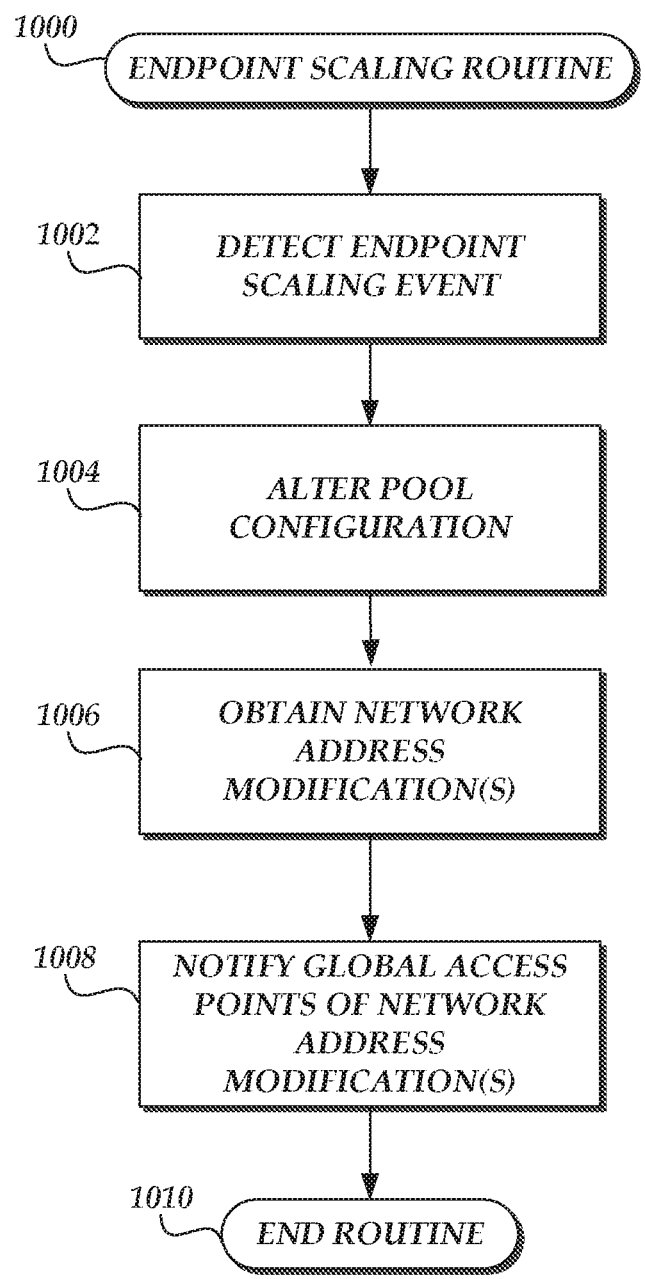
FIG. 10 depicts an illustrative routine for updating information at the global access points of FIG. 1 regarding endpoints of a data center that provide a network-accessible service.

With reference to FIG. 10, an illustrative routine 1000 will be described for updating information at the global access points 106 regarding endpoints 202 of a data center 110 that provide a network-accessible service. The routine 1000 may illustratively be implemented by a resource manager 206 within a data center 110. In one embodiment, an instance of the routine 900 is implemented by each resource manager 206 of each data center.

The routine 1000 begins at block 1002, where the resource manager 206 of a data center 110A detects an endpoint scaling event within an endpoint pool 201. An endpoint scaling event illustratively corresponds to a "scale up" or "scale down" event, indicating an addition or removal of an endpoint 202 from the pool 201. In some instances, a scaling event may also include replacement of an endpoint 202 in the pool 201. Scaling events may illustratively occur due to load on the pool 201 falling outside of desired threshold values, or due to malfunction of an endpoint 202 within the pool 201.

At block 1004, the resource manager 206 alters the pool configuration based on the detected scaling event. Illustratively, the resource manager 206 may transmit instructions to the pool 201 to alter the pools configuration, in accordance with the scaling event. For example, the resource manager 206 may instruct the pool 201 to add a new endpoint 202, remove an existing endpoint 202, or a combination thereof. Illustratively, scaling the pool 201 may include transmitting instructions to a host device to add or remove a virtual machine instance executing software corresponding to the endpoint 202 (e.g., making available a network-accessible service related to the pool 201).

At block 1006, the resource manager 206 obtains from the pool 301 network addresses of any endpoints 202 added to or removed from the pool 201. Further, at block 1008, the resource manager 206 notifies the global access points 106 of any network address modifications to the pool 201. As discussed above, the notifications may in some instances be transmitted via alterations to a configuration package (or parcel) for the access points 106. Thus, the global access points 106 may update their endpoint availability for the network-accessible service related to the pool 201, such that future requests to access the network accessible service can be routed to an available endpoint 202 in the pool 201. The routine 1000 can then end at block 1010.

Figure 11:
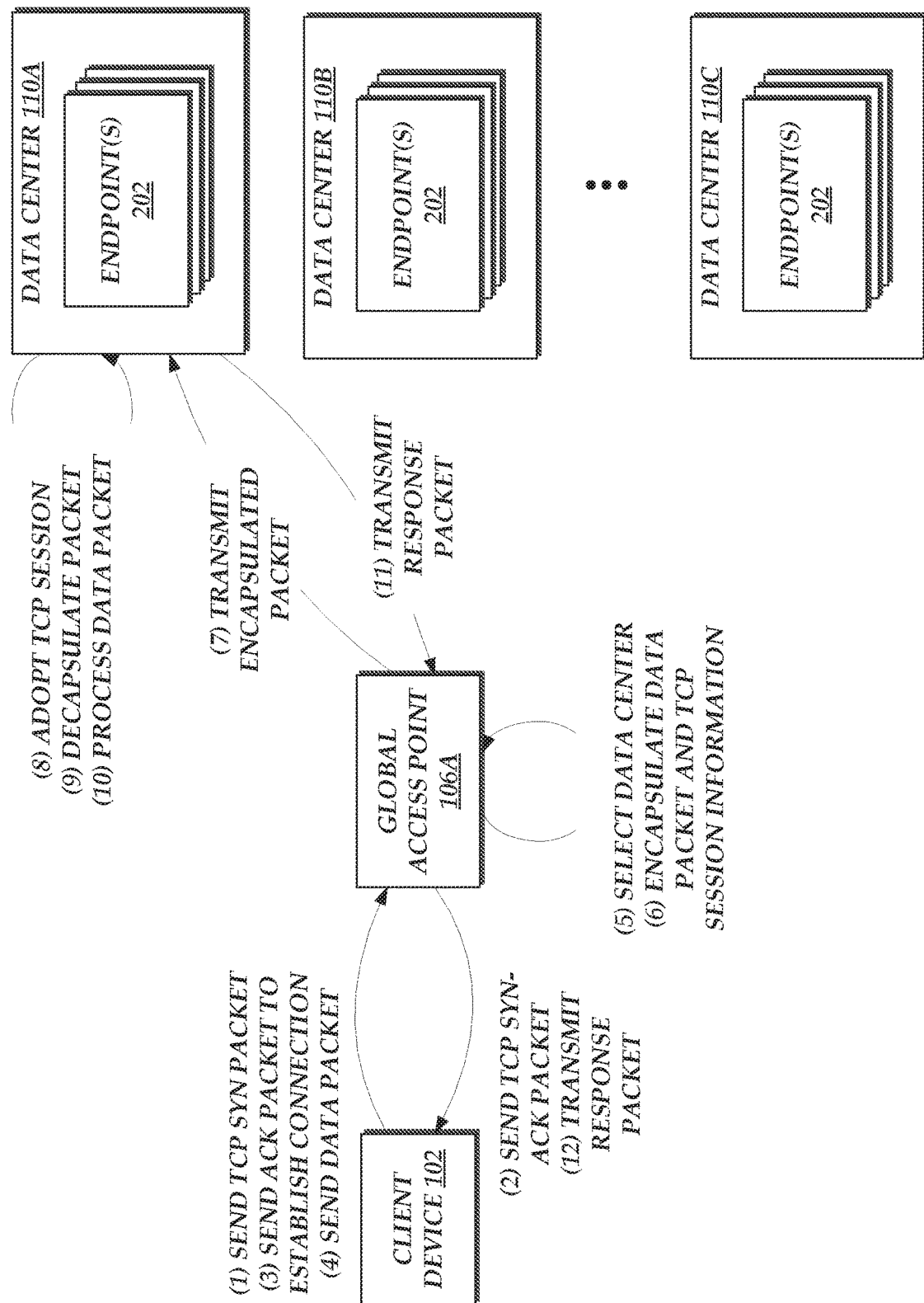
FIG. 11 depicts illustrative interactions for establishing a Transmission Control Protocol (TCP) session at a global access point of FIG. 1, and handing off the TCP session to an endpoint to enable communication of a client device and the endpoint via the TCP session.

With reference to FIG. 11, illustrative interactions will be described for conducting an initialization phase of a connection-oriented communication session at a global access point 106A, and handing off the session to a device within a data center 110, thus reducing the time required to establish such a session. The interactions of FIG. 11 may be implemented, for example, by a flow manager 304 of an access point 106. The interactions of FIG. 11 will be described with respect to a single access point 106A and data center 110A. However, similar interactions may occur with respect to other access points 106 and data centers 110, potentially concurrently. Moreover, the interactions of FIG. 11 will be described with respect to a specific type of connection-oriented communication session: a TCP session. Similar interactions may occur with respect to other connection-oriented communication sessions.

The interactions of FIG. 11 begin at (1), where a client device 102 attempts to initiate a connection-oriented communication session with a network service, by transmitting a TCP SYN packet addressed to a global network address of the service. In accordance with the functionalities described above, the TCP SYN packet is transmitted to the global access point 106A, as shown in FIG. 11. The TCP SYN packet illustratively includes a sequence number for the client device 102.

At (2), a flow manager 304 of the global access point 106A continues the TCP three-way handshake by returning to the client device 102 a TCP SYN-ACK packet, which illustratively includes a sequence number for the access point 106A (as well as acknowledging the client device's 102 sequence number). At (3), the client device 102 continues the TCP three-way handshake by returning to the access point 106A a TCP ACK packet, acknowledging the sequence number of the access point 106A. On reception of the TCP ACK packet, a TCP session is initiated between the client device 102 and the global access point 106A. Because the access point 106A is expected to be nearby to the client device 102 (e.g., in terms of latency), interactions (1)-(3) are expected to complete quickly, relative to conducting the initialization phase between the client device 102 and an endpoint 202.

At (4), the client device 102 (understanding the TCP session to have been initialized with the service), transmits a data packet within the TCP session, addressed to the global network address of the service. The data packet is routed to the global access point 106A, which at (5), selects a data center 110 to which to route the packet. Selection of a data center may occur in the same manner as described above (e.g., as interaction (3) of FIG. 6). The access point 106 further, at (6) encapsulates the data packet for transmission to the selected data center 110 (in this instance, data center 110A) via a tunnel. In the interactions of FIG. 11, it is assumed that the access point 106A has previously established a tunnel to the data center 110A (e.g., to a session handoff manager 212 of the data center 110A). For example, the access point 106A may maintain one or more idle TCP tunnels to the data center 110A for use in transmitted packets to the data center 110. However, an additional interaction may be included, wherein the global access point 106A establishes a tunnel to the data center 110A (e.g., a UDP or TCP tunnel). To facilitate handoff of the established TCP session, the encapsulated data packet also illustratively includes TCP session state information, such as the five-tuple for the TCP session and sequence numbers of the session. In the embodiment illustratively depicted in FIG. 11, the session state information is included as header information for the encapsulated data packet. At (7), the global access point 106A transmits the encapsulated packet to the data center 110A (e.g., to a session handoff manager 212 within the data center 110A).

At (8), on receiving the encapsulated packet, the device within the data center 110A (e.g., the session handoff manager 212, or in some instances an endpoint 202) adopts the TCP session, by adding information indicated within the encapsulated packet (e.g., within a header) to its own TCP session state table. The device then, at (9), decapsulates the packet of the client device 102, and at (10) processes it as if it were received directly at the device. For example, where the device is an endpoint 202, the endpoint 202 may process the data of the packet in accordance with the service requested by the client device 102. Where the device is a session handoff manager 212, the manager 212 may process the packet by identifying an endpoint 202 to service the packet (e.g., in a manner similar to interaction (4) of FIG. 6), and utilize the endpoint 202 to service the packet. Illustratively, because the session handoff manager 212 (and in this case not the endpoint 202) is a party to the TCP connection with the client device 102, the manager 212 may initiate a second TCP connection with the endpoint 202, and pass the data within the client devices 102 packet to the endpoint 202 via the second TCP session. The manager 212 may continue to operate as a proxy between the client device 102 and the endpoint 202 for future communications. For example, the manager 212 may obtain a response from the endpoint 202 and facilitate transmission of the response to the client device 102 via the TCP session with the client device 102.

At (11), the device within the data center 110A transmits a response packet to the global access point 106A, such as via the tunnel. Interaction (11) may include, for example, encapsulating the response packet for transmission via the tunnel. The global access point 106A then, at (12), forwards the response packet to the client device 102. Interaction (12) may include, for example, decapsulating the response packet for transmission to the client device 102. Further communications between the client device 102 and an endpoint 202 within the data center 110A may occur in a similar manner to interactions (4) through (7) and (9) through (12), above. Thus, the client device 102 may communicate with the data center 110A via a TCP session, without actually being required to complete an initialization phase of the session with a device of the data center 110A.

While FIG. 11 depicts illustrative interactions, these interactions may vary across embodiments. For example, while a response packet is depicted in FIG. 11 as passing through the global access point 106A, in some instances an endpoint 202 may be configured to respond directly to a client device 102, without the response passing through the access point 106A. For example, rather than encapsulating a response packet and transmitting it to the access point 106A, an endpoint 202 (or manager 212) may transmit the response packet directly to the client device 102 (e.g., over network 104), avoiding the need for encapsulation. As another variation, while session information is described in FIG. 11 as included within an encapsulated data packet, in other embodiments, session state information may be included in a separate packet. For example, a global access point 106A may be configured to separately transmit session state information to a data center 110A after conducting an initialization phase of a communication session, such as in a "session adoption" command to the data center 110A. As yet another variation, while the manager 212 is discussed above as selecting an endpoint 202 within the data center 110A to service a client device 102, in some instances an access point 106 may select such an endpoint 202, even where a manager 212 is used. For example, an access point 106 may select an endpoint 202, and notify the manager 212 of which endpoint has been selected (e.g., in headers of an encapsulated packet). In instances where the global access point 106 selects an endpoint 202 to which to route a packet, the access point 106 may modify the packet to facilitate routing to the endpoint 202. For example, the access point 106 may replace, within a destination address filed of the packet, a global network address for the service with a network address of the endpoint 202 (e.g., a "unicast" address). Thus, the interactions of FIG. 11 are intended to be illustrative in nature.

While the interactions of FIG. 11 depict interactions of a client device 102 with a single global access point 106A, in some instances a client device 102 may interact with multiple global access points 106. As noted above, each global access point 106 may be configured to advertise global network addresses to a public network (e.g., network 104), not under control of the global access points 106. Thus, devices on such a network can generally determine the access point 106 to which packets of a client device 102 addressed to a global network address are routed. In some configurations, rerouting of packets within a given packet flow to a different global access point 106 can detrimentally affect client device 102 communications. For example, where a client device 102 establishes a TCP connection that requires state information to be maintained at an individual access point 106 (e.g., a TCP connection with the access point 106 or NAT'ed through the access point 106), rerouting of client device 102 communications to a different access point 106 can undesirably break that connection.

The interactions of FIG. 11 address this scenario, by enabling TCP connections between a client device 102 and endpoint 202 (or session handoff manager 212) to be maintained even when rerouting of client device 102 packets to a different access point 106 occurs. Specifically, each access point 106 can be configured to apply the same load balancing criteria when selecting a data center 110 or endpoint 202 to which to route a client device 102's packet. Such load balancing criteria may be access point 106 agnostic (e.g., invariant regardless of the access point 106 at which it is applied). For example, the load balancing criteria may reflect latency between a client device 102 and the data center 110, as well as health of the data center 110 (or endpoints 202 therein), independent of latency to or from the access point 106. As such, each access point 106 can be expected to route a given client device 102's packets to the same data center 110. Thus, for example, if the client device 102 transmitted an additional packet to a second access point 106, the second access point 106 would apply the same load balancing criteria to select the data center 110A as a destination for the packet. The second access point 106 would then route the packet to the endpoint 202 (or session handoff manager 212), which would process the packet in the same way as if it had been routed through the access point 106A. Because the interactions of FIG. 11 do not require state information to be maintained at the access point 106A, and because the encapsulation mechanism of FIG. 11 maintains a source network address of the client device 102 within encapsulated packets, no interruption of a connection-oriented communication session (e.g., a TCP session) would occur. Thus, the interactions of FIG. 11 address rerouting problems that would otherwise occur when utilizing anycast technologies to shape routing of connection-oriented communication sessions.

Figure 12:
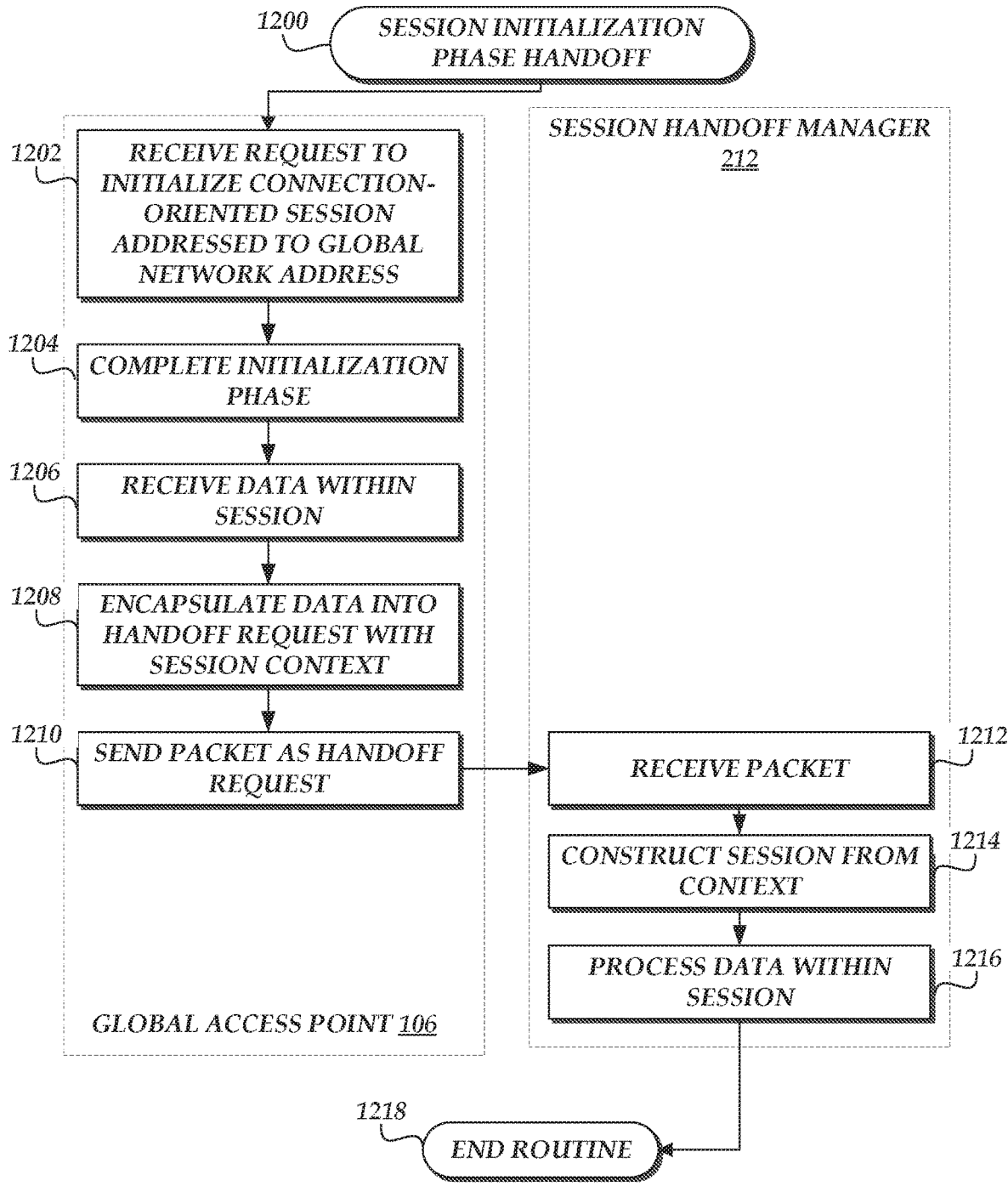
FIG. 12 depicts an illustrative routine for establishing a Transmission Control Protocol (TCP) session at a global access point of FIG. 1, and handing off the TCP session to an endpoint to enable communication of a client device and the endpoint via the TCP session.

With reference to FIG. 12, an illustrative routine 1200 will be described for initialization of a connection-oriented communication session at a global access point 106A, and handoff of the session to a manager 212 within a data center 110. The routine 1200 is illustratively implemented cooperatively between the global access point 106A and the session to a manager 212, and thus the boxes of the routine 1200 are divided among such devices. While portions of the routine 1200 is depicted as being implemented by a manager 212, these portions may alternatively be implemented directly within an endpoint 202 in some instances.

The routine 1200 begins at block 1202, where the access point 106 (e.g., a flow manager 304) obtains a request addressed to a global network address of a service to initiate a connection-oriented communication session with the service. The request may be, for example, a TCP SYN packet.

At block 1204, the access point 106 completes an initialization phase of the session, according to the particular protocol used for the session. Where the protocol is TCP for example, the initialization phase may include conducting a three-way handshake with the client device 102.

At block 1206, the access point 106 receives a data packet from the client device 102 within the session. For example, the packet may be a payload packet within a TCP session.

At block 1208, the access point 106 encapsulates the data packet, for transmission to the manager 212 via a network tunnel. The access point 106 further includes in the encapsulated packet (e.g., as a header information for the encapsulated packet) session context for the communication session, such as a TCP five-tuple and sequence numbers. The access point 106 then, at block 1210, sends the packet to the handoff manager 212 as a handoff request for the communication session.

At block 1212, the handoff manager 212 receives the encapsulated packet, and at block 1214, constructs within its local data a communication session, based on the context information from the access point 106. The manager 212 thus adopts the session, enabling subsequent communications within the session between the client device 102 and the manager 212. At block 1216, the handoff manager 212 decapsulates the data packet of the client device 102, and processes the packet within the session. For example, the manager 212 may select and endpoint 202 to handle the request, and transmit the content of the data packet to the endpoint 202 via another communication session. The routine 1200 then ends at block 1218. Thus, the client device 102 and the manager 212 may communicate via the stateful session, with requiring the client device 102 and the manager 21 to communicate to establish the session.

The routine 1200 may include additional or alternative blocks than those descried above. For example, prior to sending an encapsulated packet as a handoff request at block 1210, the access point 106 may select a data center to receive the handoff request, in a manner similar to selection of a data center discussed in FIG. 9. Moreover, while the routine 1200 is depicted as ending subsequent to block 1216, the access point 106 and manager 212 may continue to operate to facilitate communications of or to a client device 120 within the session, as discussed above. Thus, the number and arrangement of blocks in FIG. 12 is illustrative in nature.

All of the methods and processes described above may be embodied in, and fully automated via, software code modules executed by one or more general purpose computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A system comprising:
   a plurality of endpoint systems, each endpoint system being situated in a different geographic location and containing at least one endpoint computing device configured to provide a network-accessible service associated with a network address;
   at least two access points to the network-accessible service, each of the at least two access points comprising a processor, being situated in a different geographic location, and configured to:
   utilize anycast methodology to advertise a network prefix of the network address as reachable via the access point;

receive from a client device a request to initiate a Transmission Control Protocol (TCP) session with the network-accessible service;

conduct an initialization phase of the TCP session to establish context information for the TCP session including at least one sequence number;

receive from the client device a data packet as a part of the TCP session;

select an endpoint system, from the plurality of endpoint systems, to which to route the data packet; and transmit to the endpoint system the data packet and the context information for the TCP session;

wherein each endpoint system further comprises a session handoff device configured to adopt TCP sessions from individual access points based on context information received from the individual access points, to process data packets from client devices within the adopted TCP sessions to provide the network-accessible service and further configured, for a given adopted TCP session, to:

establish a distinct TCP session with at least one endpoint computing device of the endpoint system; and for individual data packets received via the given adopted TCP session, generate and transmit corresponding individual data packets to the at least one endpoint computing device of the endpoint system via the distinct TCP session.

2. The system of claim 1, wherein the session handoff device is further configured, for the given adopted TCP session, to select the at least one endpoint computing device of the endpoint system to provide the network-accessible service.

3. The system of claim 1, wherein the at least one endpoint computing device within each endpoint system is configured to respond directly to the client devices associated with adopted TCP sessions, independently of the at least two access points.

4. A method comprising:

advertising a network address of a network-accessible service as reachable via each access point of a plurality of access points to the network-accessible service distributed across a geographic area;

at a first access point of the plurality of access points:

receiving from a client device a request to initiate a connection-oriented communication session with the network-accessible service;

conducting an initialization phase of the connection-oriented communication session to establish context information for the connection-oriented communication session;

receiving from the client device a data packet as a part of the connection-oriented communication session;

applying selection criteria to select an endpoint system, from a plurality of endpoint systems for the network-accessible service, to which to route the data packet; and transmitting to the endpoint system the data packet and the context information for the connection-oriented communication session;

at a session handoff device of the endpoint system:

utilizing the context information to adopt the connection-oriented communication session;

establishing a distinct connection-oriented communication session with at least one endpoint computing device of the endpoint system; and for individual data packets received via the adopted connection-oriented communication session, generate and transmit corresponding individual data packets to the at least one endpoint computing device of the endpoint system via the distinct connection-oriented communication session;

wherein the at least one endpoint computing device of the endpoint system is configured to process the data packet within the distinct connection-oriented communication session to provide the network-accessible service.

5. The method of claim 4, wherein the connection-oriented communication session is a Transmission Control Protocol (TCP) session.

6. The method of claim 4, wherein transmitting the data packet to the endpoint system comprises encapsulating the data packet to result in an encapsulated data packet and transmitting the encapsulated data packet over a network tunnel.

7. The method of claim 6, wherein transmitting the context information to the endpoint system comprises adding the context information to a header of the encapsulated data packet.

8. The method of claim 4, wherein transmitting the data packet to the endpoint system comprises replacing, as a destination network address of the data packet, the network address of the network-accessible service with a network address of the endpoint system.

9. The method of claim 4 further comprising:

receiving a response to the data packet as part of the connection-oriented communication session; and returning the response to the client device.

10. The method of claim 4 further comprising, at a second access point of the plurality of access points:

receiving from the client device a second data packet as part of the connection-oriented communication session;

applying the selection criteria, as previously applied by the first access point, to select the endpoint system as a destination to which to route the second data packet; and transmitting to the endpoint system the second data packet as part of the connection-oriented communication session.

11. One or more non-transitory computer-readable media comprising computer-executable instructions that, when executed by each access point, of a plurality of access points to a network-accessible service distributed across a geographic area, configures each access point to:

advertise a network address of the network-accessible service as reachable via each access point;

receive from a client device a request to initiate a connection-oriented communication session with the network-accessible service;

conduct an initialization phase of the connection-oriented communication session to establish context information for the connection-oriented communication session;

receive from the client device a data packet as a part of the connection-oriented communication session;

select an endpoint system, from a plurality of endpoint systems of the network-accessible service, to which to route the data packet; and transmit to the endpoint system the data packet and the context information for the connection-oriented communication session;

wherein the non-transitory computer-readable media further comprises computer-executable instructions that, when executed by a session handoff device of the endpoint system, causes the session handoff device to:
utilize the context information to adopt the connection-oriented communication session;
establishing a distinct connection-oriented communication session with at least one endpoint computing device of the endpoint system; and
for individual data packets received via the adopted connection-oriented communication session, generate and transmit corresponding individual data packets to the at least one endpoint computing device of the endpoint system via the distinct connection-oriented communication session;
wherein the at least one endpoint computing device of the endpoint system is configured to process the data packet within the distinct connection-oriented communication session to provide the network-accessible service.

12. The one or more non-transitory computer-readable media of claim 11, wherein to transmit to the endpoint system the data packet and the context information, the instructions configure each access point to establish a network tunnel to the endpoint system and to transmit the data packet and the context information via the network tunnel.

13. The one or more non-transitory computer-readable media of claim 12, wherein the data packet and the context information are transmitted independently within the network tunnel.

14. The one or more non-transitory computer-readable media of claim 12, wherein to select the endpoint system, the instructions configure each access point to apply uniform selection criteria that is independent of the individual access point on which the uniform selection criteria is applied.

15. The one or more non-transitory computer-readable media of claim 14, wherein the instructions further configure each access point to:

receive from a second client device a second data packet as a part of a second connection-oriented communication session, the second connection-oriented communication session being between the second client device and the endpoint system and established based at least partly on interactions between the second client device and a different access point;

apply uniform selection criteria the select the endpoint system as a destination for the second data packet; and transmit to the endpoint system the second data packet as part of the second connection-oriented communication session.

16. The one or more non-transitory computer-readable media of claim 11, wherein the instructions further configure each access point to select the at least one endpoint computing device within the endpoint system to which.

* * * * *

UNITED STATES PATENT AND TRADEMARK OFFICE
CERTIFICATE OF CORRECTION

PATENT NO. : 10,848,427 B2  Page 1 of 1
APPLICATION NO. : 16/219797
DATED : November 24, 2020
INVENTOR(S) : Anton Stephen Radlein It is certified that error appears in the above-identified patent and that said Letters Patent is hereby corrected as shown below:

In the Specification

In Column 22, Line 58, delete "network" and insert --networks--.

In Column 22, Line 66, delete "network" and insert --networks--.

In the Claims

In Column 38, Line 25 (Approx.), Claim 16, delete "to which." and insert --.--.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*